US012802651B2

(12) United States Patent
Pyun et al.

(10) Patent No.: US 12,802,651 B2
(45) Date of Patent: Nov. 17, 2026

(54) DRIVING CONTROLLER FOR REDUCING POWER CONSUMPTION, DISPLAY DEVICE INCLUDING THE SAME, AND ELECTRONIC DEVICE INCLUDING THE SAME

(71) Applicant: Samsung Display Co., Ltd., Yongin-si (KR)

(72) Inventors: Kihyun Pyun, Yongin-si (KR); Jungeon An, Yongin-si (KR)

(73) Assignee: Samsung Display Co., Ltd., Yongin-si (KR)

(*) Notice: Subject to any disclaimer, the term of this patent is extended or adjusted under 35 U.S.C. 154(b) by 0 days.

(21) Appl. No.: 18/986,432

(22) Filed: Dec. 18, 2024

(65) Prior Publication Data

US 2025/0279068 A1 Sep. 4, 2025

(30) Foreign Application Priority Data

Feb. 29, 2024 (KR) ........................ 10-2024-0029529

(51) Int. Cl.
*G09G 3/3275* (2016.01)

(52) U.S. Cl.
CPC ... *G09G 3/3275* (2013.01); *G09G 2320/0271* (2013.01); *G09G 2330/021* (2013.01); *G09G 2330/025* (2013.01); *G09G 2330/028* (2013.01)

(58) Field of Classification Search
CPC ... G09G 3/30–3291; G09G 2310/0243; G09G 2310/0272; G09G 2320/0271; G09G 2330/021; G09G 2330/025; G09G 2330/028; G09G 2330/04; G09G 2330/12; G09G 2360/16
See application file for complete search history.

(56) References Cited

U.S. PATENT DOCUMENTS 8,018,405 B2 9/2011 Kwak et al.
9,576,522 B2 2/2017 Kim et al.
(Continued)

FOREIGN PATENT DOCUMENTS

KR 10-0662998 B1 12/2006
KR 10-1983368 B1 5/2019
(Continued)

*Primary Examiner* — Keith L Crawley
(74) *Attorney, Agent, or Firm* — Womble Bond Dickinson (US) LLP

(57) ABSTRACT

A driving controller includes a voltage determination block to analyze a grayscale of an input image signal, and to output a voltage signal according to the analyzed grayscale, a power luminance controller to calculate a load of the input image signal, an overcurrent-reference-setting block to output an overcurrent reference value based on the voltage signal and the load, a current-sensing-and-overcurrent-determining unit to receive a feedback current signal, to compare a current level of the feedback current signal with the overcurrent reference value, and to output a first signal, and a voltage controller to output a voltage control signal for setting a voltage level of a first driving voltage based on the voltage signal and the first signal, wherein the overcurrent-reference-setting block outputs the overcurrent reference value based on a current error corresponding to the voltage level indicated by the voltage signal, and a maximum current corresponding to the load.

20 Claims, 16 Drawing Sheets

(56) References Cited

U.S. PATENT DOCUMENTS

| | | | | |
|---|---|---|---|---|
| 10,977,993 | B2 | 4/2021 | Jang et al. | |
| 11,825,714 | B2 | 11/2023 | Kim et al. | |
| 2011/0043505 | A1* | 2/2011 | Ahn | H05B 45/60 345/211 |
| 2016/0148570 | A1* | 5/2016 | Lee | G09G 3/3225 315/308 |
| 2016/0293107 | A1* | 10/2016 | Jeong | G09G 3/3233 |
| 2021/0049954 | A1* | 2/2021 | Lee | G09G 3/3406 |
| 2021/0201781 | A1* | 7/2021 | Kim | G09G 3/3233 |
| 2021/0281175 | A1* | 9/2021 | Han | H02M 1/44 |
| 2022/0215803 | A1* | 7/2022 | Pyun | G09G 3/3258 |
| 2022/0309985 | A1* | 9/2022 | Pyun | G09G 3/2007 |
| 2023/0025117 | A1* | 1/2023 | Kim | G05F 1/565 |
| 2023/0186831 | A1* | 6/2023 | Pyun | G09G 3/32 345/55 |
| 2023/0260459 | A1* | 8/2023 | Pyun | G09G 3/3258 |
| 2024/0013692 | A1* | 1/2024 | Ryu | G09G 3/32 |
| 2024/0154530 | A1* | 5/2024 | Kim | H02M 1/0032 |
| 2024/0428742 | A1* | 12/2024 | Pyun | G09G 3/3275 |
| 2025/0095567 | A1* | 3/2025 | Kim | G09G 3/3225 |
| 2025/0140154 | A1* | 5/2025 | Pyun | G09G 3/2007 |

FOREIGN PATENT DOCUMENTS

| | | | |
|---|---|---|---|
| KR | 10-2000643 | B1 | 7/2019 |
| KR | 10-2020-0070061 | A | 6/2020 |
| KR | 10-2021-0112429 | A | 9/2021 |

* cited by examiner

DRIVING CONTROLLER FOR REDUCING POWER CONSUMPTION, DISPLAY DEVICE INCLUDING THE SAME, AND ELECTRONIC DEVICE INCLUDING THE SAME

CROSS-REFERENCE TO RELATED APPLICATION

The present application claims priority to, and the benefit of, Korean Patent Application No. 10-2024-0029529, filed on Feb. 29, 2024, in the Korean Intellectual Property Office, the entire disclosures of which is incorporated herein by reference.

BACKGROUND

1. Field

Embodiments of the present disclosure described herein relate to an electronic device including a driving controller.

2. Description of the Related Art

Electronic devices, which provide images to users, such as a smart phone, a digital camera, a notebook computer, a navigation system, a monitor, and a smart television for displaying the images. The electronic device generates an image and provides the users with the generated image through a display screen.

The electronic device includes a display panel and a driving controller for controlling the display panel. The driving controller may provide a data signal to the display panel. As a current corresponding to the data signal may be provided to pixels of the display panel, an image may be displayed.

To reduce or prevent increased power consumption of an electronic device, the driving controller may adjust the luminance of the display panel depending on the load of an input video signal. For example, the driving controller may reduce the luminance of the display panel when the load of the input image signal is relatively great. When the load of the input image signal is relatively small, the luminance of the display panel may not be reduced.

SUMMARY

Embodiments of the present disclosure provide a driving controller capable of reducing the power consumption of the display panel and reducing or minimizing degradation of display quality, and an electronic device including the same.

According to one or more embodiments, a driving controller includes a voltage determination block configured to analyze a grayscale of an input image signal, and to output a voltage signal according to the analyzed grayscale, a power luminance controller configured to calculate a load of the input image signal, an overcurrent-reference-setting block configured to output an overcurrent reference value based on the voltage signal and based on the load, a current-sensing-and-overcurrent-determining unit configured to receive a feedback current signal, to compare a current level of the feedback current signal with the overcurrent reference value, and to output a first signal corresponding to a comparison result, and a voltage controller configured to output a voltage control signal for setting a voltage level of a first driving voltage based on the voltage signal and based on the first signal, wherein the overcurrent-reference-setting block is further configured to output the overcurrent reference value based on a current error corresponding to the voltage level of the first driving voltage, which is indicated by the voltage signal, and a maximum current corresponding to the load.

The current error may have a value that is greater as the voltage level of the first driving voltage indicated by the voltage signal is higher.

The overcurrent reference value may decrease as a value of the current error increases.

The driving controller may further include a current error lookup table configured to store the current error corresponding to the voltage level of the first driving voltage indicated by the voltage signal, and a load-current lookup table configured to store the maximum current corresponding to the load.

The overcurrent-reference-setting block may be configured to output the overcurrent reference value based on the current error and the maximum current.

The overcurrent-reference-setting block may be configured to output the overcurrent reference value based on Equation 1 (P_TH−ELVDD×(L_LD+ERR))/ELVDD+I_LD), P_TH denoting a rush power reference value, I_LD denoting the maximum current, ELVDD denoting the voltage level of the first driving voltage, and ERR denoting the current error.

The current-sensing-and-overcurrent-determining unit may be configured to output the first signal of a first level when the current level of the feedback current signal is less than the overcurrent reference value, and output the first signal of a second level when the current level of the feedback current signal is greater than or equal to the overcurrent reference value.

The voltage controller may be configured to output the voltage control signal corresponding to the voltage level of the first driving voltage when the first signal is at the first level, and output the voltage control signal corresponding to a voltage level that is lower than the voltage level of the first driving voltage when the first signal is at the second level.

The voltage determination block may include a grayscale analyzer configured to extract a highest grayscale of the input image signal of one frame, and a power control block configured to determine the voltage level of the first driving voltage based on the highest grayscale and the load.

The voltage level of the first driving voltage may increase as the highest grayscale increases.

According to one or more embodiments, an electronic device includes a display panel, a driving controller configured to receive an input image signal, and to output an image data signal, a data-driving circuit configured to provide the display panel with a data signal corresponding to the image data signal, and a voltage generator configured to provide a first driving voltage to the display panel in response to a voltage control signal, wherein the driving controller includes a voltage determination block configured to analyze a grayscale of the input image signal and to output a voltage signal according to the analyzed grayscale, a power luminance controller configured to calculate a load of the input image signal, an overcurrent-reference-setting block configured to output an overcurrent reference value based on the voltage signal and the load, a current-sensing-and-overcurrent-determining unit configured to receive a feedback current signal from the display panel, to compare a current level of the feedback current signal with the overcurrent reference value, and to output a first signal corresponding to a comparison result, and a voltage controller configured to output the voltage control signal for setting a voltage level of the first driving voltage based on the voltage signal and the first signal, and wherein the overcurrent-reference-setting block is further configured to output the overcurrent reference value based on a current error corresponding to the voltage level of the first driving voltage, which is indicated by the voltage signal, and a maximum current corresponding to the load.

A value of the current error may increase as the voltage level of the first driving voltage indicated by the voltage signal increases.

The overcurrent reference value may decrease as a value of the current error increases.

The driving controller may further include a current error lookup table configured to store the current error corresponding to the voltage level of the first driving voltage, and a load-current lookup table configured to store the maximum current.

The overcurrent-reference-setting block may be configured to output the overcurrent reference value based on the current error and the maximum current.

The overcurrent-reference-setting block may be configured to output the overcurrent reference value based on P_TH−ELVDD×(I_LD+ERR))/ELVDD+I_LD, P_TH denoting a rush power reference value, I_LD denoting the maximum current, ELVDD denoting the voltage level of the first driving voltage, and ERR denoting the current error corresponding to the voltage level of the first driving voltage.

The current-sensing-and-overcurrent-determining unit may be further configured to output the first signal of a first level when the current level of the feedback current signal is less than the overcurrent reference value, and output the first signal of a second level when the current level of the feedback current signal is greater than or equal to the overcurrent reference value.

The voltage controller may be configured to output the voltage control signal corresponding to the voltage level of the first driving voltage when the first signal is at the first level, and output the voltage control signal corresponding to a voltage level that is lower than the voltage level of the first driving voltage when the first signal is at the second level.

The voltage determination block may include a grayscale analyzer configured to extract a highest grayscale of the input image signal of one frame, and a power control block configured to determine the voltage level of the first driving voltage based on the highest grayscale and the load.

The voltage level of the first driving voltage may increase as the highest grayscale increases.

BRIEF DESCRIPTION OF THE DRAWINGS

The above and other aspects of the present disclosure will become apparent by describing in detail embodiments thereof with reference to the accompanying drawings.

DETAILED DESCRIPTION

Figure 1:
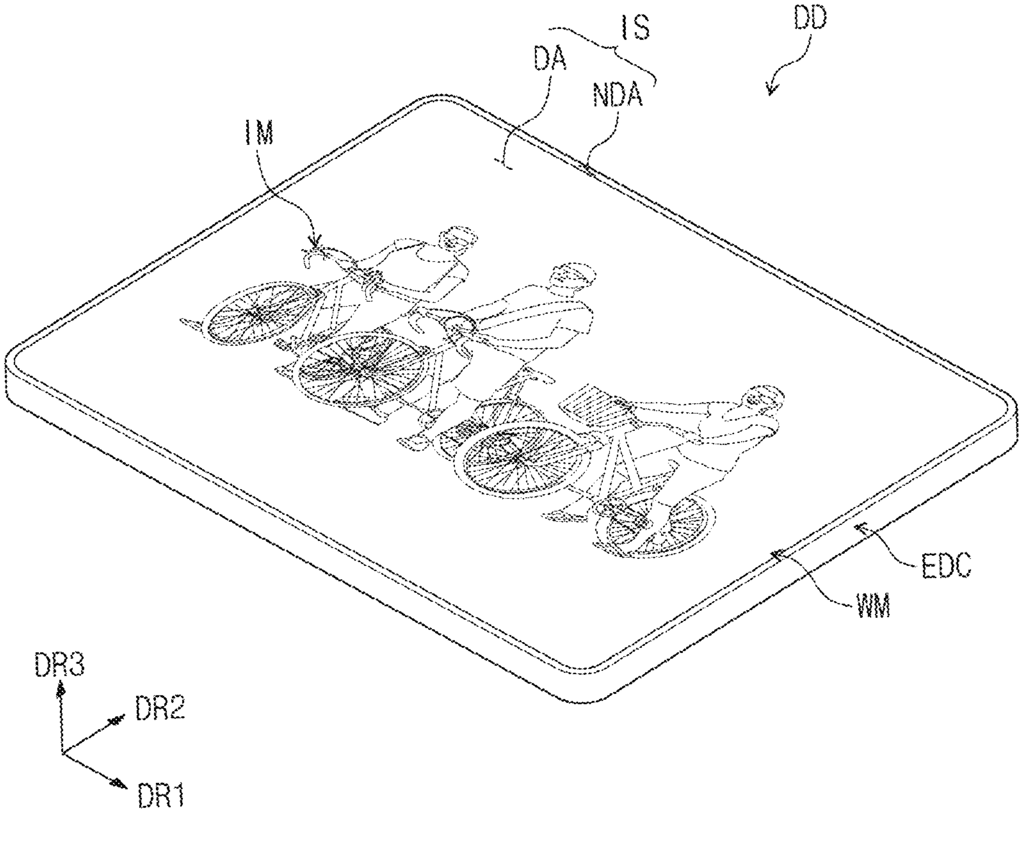
FIG. 1 is a perspective view of an electronic device, according to one or more embodiments of the present disclosure.

Aspects of some embodiments of the present disclosure and methods of accomplishing the same may be understood more readily by reference to the detailed description of embodiments and the accompanying drawings. The described embodiments are provided as examples so that this disclosure will be thorough and complete, and will fully convey the aspects of the present disclosure to those skilled in the art. Accordingly, processes, elements, and techniques that are redundant, that are unrelated or irrelevant to the description of the embodiments, or that are not necessary to those having ordinary skill in the art for a complete understanding of the aspects of the present disclosure may be omitted. Unless otherwise noted, like reference numerals, characters, or combinations thereof denote like elements throughout the attached drawings and the written description, and thus, repeated descriptions thereof may be omitted.

The described embodiments may have various modifications and may be embodied in different forms, and should not be construed as being limited to only the illustrated embodiments herein. The use of "can," "may," or "may not" in describing an embodiment corresponds to one or more embodiments of the present disclosure.

A person of ordinary skill in the art would appreciate, in view of the present disclosure in its entirety, that each suitable feature of the various embodiments of the present disclosure may be combined or combined with each other, partially or entirely, and may be technically interlocked and operated in various suitable ways, and each embodiment may be implemented independently of each other or in conjunction with each other in any suitable manner unless otherwise stated or implied.

In the drawings, the relative sizes of elements, layers, and regions may be exaggerated for clarity and/or descriptive purposes. In other words, because the sizes and thicknesses of elements in the drawings are arbitrarily illustrated for convenience of description, the disclosure is not limited thereto.

It will be understood that when an element, layer, region, or component is referred to as being "formed on," "on," "connected to," or "(operatively or communicatively) coupled to" another element, layer, region, or component, it can be directly formed on, on, connected to, or coupled to the other element, layer, region, or component, or indirectly formed on, on, connected to, or coupled to the other element, layer, region, or component such that one or more intervening elements, layers, regions, or components may be present. In addition, this may collectively mean a direct or indirect coupling or connection and an integral or non-integral coupling or connection. For example, when a layer, region, or component is referred to as being "electrically connected" or "electrically coupled" to another layer, region, or component, it can be directly electrically connected or coupled to the other layer, region, and/or component or one or more intervening layers, regions, or components may be present. The one or more intervening components may include a switch, a resistor, a capacitor, and/or the like. In describing embodiments, an expression of connection indicates electrical connection unless explicitly described to be direct connection, and "directly connected/directly coupled," or "directly on," refers to one component directly connecting or coupling another component, or being on another component, without an intermediate component. Other expressions describing relationships between components, such as "between," "immediately between" or "adjacent to" and "directly adjacent to," may be construed similarly. It will be understood that when an element or layer is referred to as being "between" two elements or layers, it can be the only element or layer between the two elements or layers, or one or more intervening elements or layers may also be present.

For the purposes of this disclosure, expressions such as "at least one of," or "any one of," or "one or more of" when preceding a list of elements, modify the entire list of elements and do not modify the individual elements of the list. For example, "at least one of X, Y, and Z," "at least one of X, Y, or Z," "at least one selected from the group consisting of X, Y, and Z," and "at least one selected from the group consisting of X, Y, or Z" may be construed as X only, Y only, Z only, any combination of two or more of X, Y, and Z, such as, for instance, XYZ, XYY, YZ, and ZZ, or any variation thereof. Similarly, the expressions "at least one of A and B" and "at least one of A or B" may include A, B, or A and B. As used herein, "or" generally means "and/or," and the term "and/or" includes any and all combinations of one or more of the associated listed items. For example, the expression "A and/or B" may include A, B, or A and B. Similarly, expressions such as "at least one of," "a plurality of," "one of," and other prepositional phrases, when preceding a list of elements, modify the entire list of elements and do not modify the individual elements of the list. When "C to D" is stated, it means C or more and D or less, unless otherwise specified.

It will be understood that, although the terms "first," "second," "third," etc., may be used herein to describe various elements, components, regions, layers and/or sections, these elements, components, regions, layers and/or sections should not be limited by these terms. These terms do not correspond to a particular order, position, or superiority, and are used only used to distinguish one element, member, component, region, area, layer, section, or portion from another element, member, component, region, area, layer, section, or portion. Thus, a first element, component, region, layer or section described below could be termed a second element, component, region, layer or section, without departing from the spirit and scope of the present disclosure. The description of an element as a "first" element may not require or imply the presence of a second element or other elements. The terms "first," "second," etc. may also be used herein to differentiate different categories or sets of elements. For conciseness, the terms "first," "second," etc. may represent "first-category (or first-set)," "second-category (or second-set)," etc., respectively.

In the examples, the x-axis, the y-axis, and/or the z-axis are not limited to three axes of a rectangular coordinate system, and may be interpreted in a broader sense. For example, the x-axis, the y-axis, and the z-axis may be perpendicular to one another, or may represent different directions that are not perpendicular to one another. The same applies for first, second, and/or third directions.

The terminology used herein is for the purpose of describing embodiments only and is not intended to be limiting of the present disclosure. As used herein, the singular forms "a" and "an" are intended to include the plural forms as well, while the plural forms are also intended to include the singular forms, unless the context clearly indicates otherwise. It will be further understood that the terms "comprises," "comprising," "have," "having," "includes," and "including," when used in this specification, specify the presence of the stated features, integers, steps, operations, elements, and/or components, but do not preclude the presence or addition of one or more other features, integers, steps, operations, elements, components, and/or groups thereof.

As used herein, the terms "substantially," "about," "approximately," and similar terms are used as terms of approximation and not as terms of degree, and are intended to account for the inherent deviations in measured or calculated values that would be recognized by those of ordinary skill in the art. For example, "substantially" may include a range of +/−5% of a corresponding value. "About" or "approximately," as used herein, is inclusive of the stated value and means within an acceptable range of deviation for the particular value as determined by one of ordinary skill in the art, considering the measurement in question and the error associated with measurement of the particular quantity (i.e., the limitations of the measurement system). For example, "about" may mean within one or more standard deviations, or within ±30%, 20%, 10%, 5% of the stated value. Further, the use of "may" when describing embodiments of the present disclosure refers to "one or more embodiments of the present disclosure."

In some embodiments well-known structures and devices may be described in the accompanying drawings in relation to one or more functional blocks (e.g., block diagrams), units, and/or modules to avoid unnecessarily obscuring various embodiments. Those skilled in the art will understand that such block, unit, and/or module are/is physically implemented by a logic circuit, an individual component, a microprocessor, a hard wire circuit, a memory element, a line connection, and other electronic circuits. This may be formed using a semiconductor-based manufacturing technique or other manufacturing techniques. The block, unit, and/or module implemented by a microprocessor or other similar hardware may be programmed and controlled using software to perform various functions discussed herein, optionally may be driven by firmware and/or software. In addition, each block, unit, and/or module may be implemented by dedicated hardware, or a combination of dedicated hardware that performs some functions and a processor (for example, one or more programmed microprocessors and related circuits) that performs a function different from those of the dedicated hardware. In addition, in some embodiments, the block, unit, and/or module may be physically separated into two or more interact individual blocks, units, and/or modules without departing from the scope of the present disclosure. In addition, in some embodiments, the block, unit and/or module may be physically combined into more complex blocks, units, and/or modules without departing from the scope of the present disclosure.

Unless otherwise defined, all terms (including technical and scientific terms) used herein have the same meaning as commonly understood by one of ordinary skill in the art to which the present disclosure belongs. It will be further understood that terms, such as those defined in commonly used dictionaries, should be interpreted as having a meaning that is consistent with their meaning in the context of the relevant art and/or the present specification, and should not be interpreted in an idealized or overly formal sense, unless expressly so defined herein.

Figure 2:
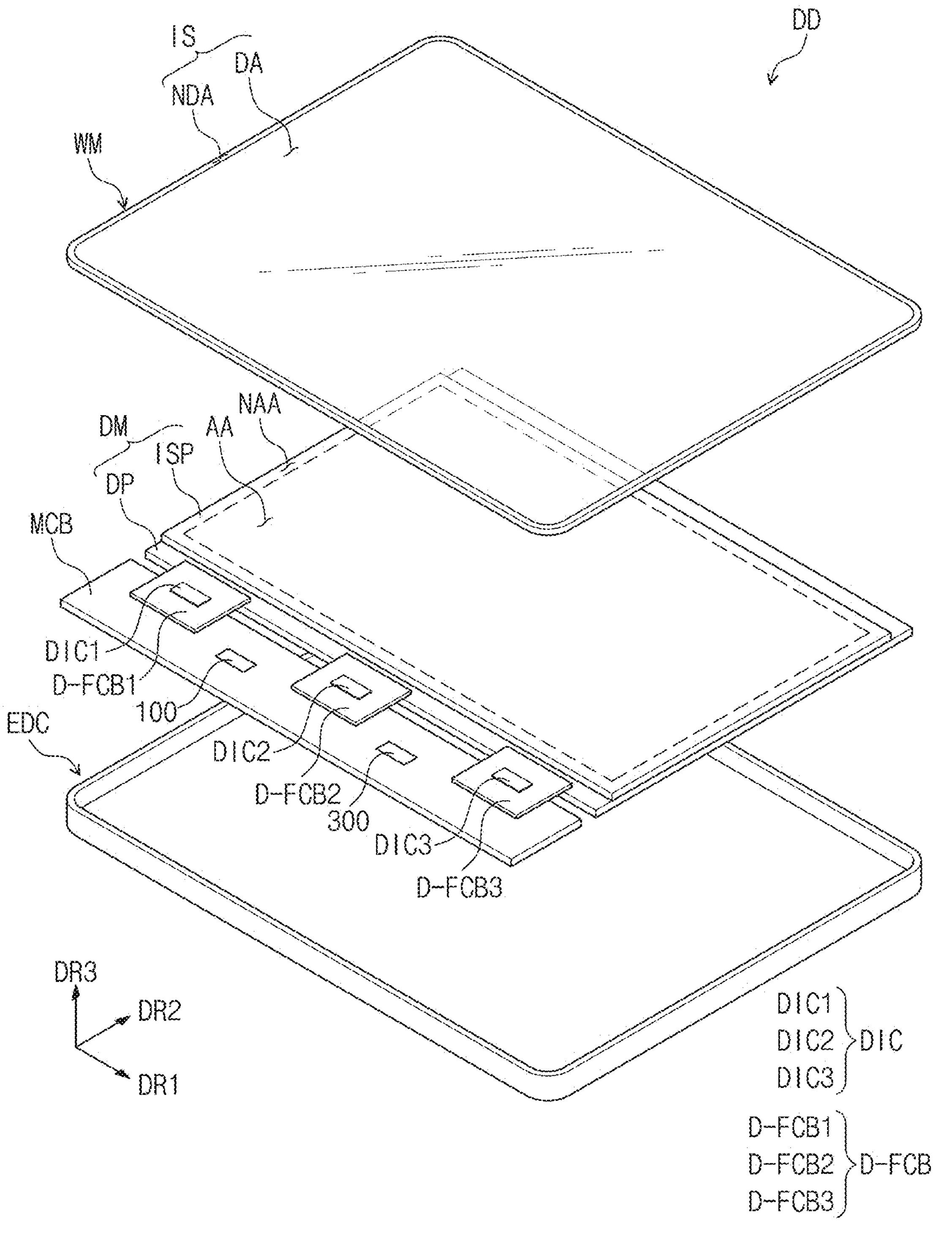
FIG. 2 is an exploded perspective view of an electronic device, according to one or more embodiments of the present disclosure.

FIG. 1 is a perspective view of an electronic device DD, according to one or more embodiments of the present disclosure. FIG. 2 is an exploded perspective view of the electronic device DD, according to one or more embodiments of the present disclosure.

Referring to FIGS. 1 and 2, the electronic device DD may be a device activated depending on an electrical signal. The electronic device DD according to one or more embodiments of the present disclosure may be a small and medium-sized electronic device, such as a mobile phone, a tablet PC, a notebook computer, a vehicle navigation system, or a game console, as well as a large-sized electronic device, such as a television or a monitor. The above examples are provided only as examples, and it is obvious that the electronic device DD may be applied to any other electronic device(s) without departing from the concept of the present disclosure. The electronic device DD is in a shape of a rectangle having a long side in a first direction DR1, and a short side in a second direction DR2 intersecting the first direction DR1. However, the shape of the electronic device DD is not limited thereto. For example, the electronic device DD may be implemented in various shapes. The electronic device DD may display an image IM on a display surface IS parallel to each of the first direction DR1 and the second direction DR2, so as to face a third direction DR3.

In one or more embodiments, a front surface (or an upper/top surface) and a rear surface (or a lower/bottom surface) of each member are defined based on a direction in which the image IM is displayed. The front surface may be opposite to the rear surface in the third direction DR3, and a normal direction of each of the front surface and the rear surface may be parallel to the third direction DR3.

A separation distance between the front surface and the rear surface in the third direction DR3 may correspond to a thickness of the electronic device DD in the third direction DR3. Meanwhile, directions that the first, second, and third directions DR1, DR2, and DR3 indicate may be relative in concept and may be changed to different directions.

The electronic device DD may sense an external input applied from the outside. The external input may include various types of inputs that are provided from the outside of the electronic device DD. The electronic device DD according to one or more embodiments of the present disclosure may sense an external input of a user, which is applied from the outside. The external input of the user may be one of various types of external inputs, such as a part of his/her body, light, heat, his/her gaze, and pressure, or a combination thereof. Also, the electronic device DD may sense the external input of the user applied to a side surface or a rear surface of the electronic device DD depending on a structure of the electronic device DD and is not limited to one or more embodiments. As an example of the present disclosure, an external input may include an input entered through an input device (e.g., a stylus pen, an active pen, a touch pen, an electronic pen, or an E-pen).

The display surface IS of the electronic device DD may be divided into a display area DA and a non-display area NDA. The display area DA may be an area in which the image IM is displayed. A user perceives (or views) the image IM through the display area DA. In one or more embodiments, the display area DA is illustrated in the shape of a quadrangle whose vertexes are rounded. However, this is illustrated as an example. The display area DA may have various shapes, not limited to one or more embodiments.

The non-display area NDA is adjacent to the display area DA. The non-display area NDA may have a given color. The non-display area NDA may surround the display area DA (e.g., in plan view). Accordingly, a shape of the display area DA may be defined substantially by the non-display area NDA. However, this is illustrated as an example. The non-display area NDA may be positioned to be adjacent to only one side of the display area DA or may be omitted. The electronic device DD according to one or more embodiments of the present disclosure may include various embodiments and is not limited to one or more embodiments.

As illustrated in FIG. 2, the electronic device DD may include a display module DM and a window WM located on the display module DM. The display module DM may include a display panel DP and an input-sensing layer ISP.

According to one or more embodiments of the present disclosure, the display panel DP may include a light-emitting display panel. For example, the display panel DP may be an organic light-emitting display panel, an inorganic light-emitting display panel, or a quantum dot light-emitting display panel. A light-emitting layer of the organic light-emitting display panel may include an organic light-emitting material. A light-emitting layer of the inorganic light-emitting display panel may include an inorganic light-emitting material. A light-emitting layer of the quantum dot light-emitting display panel may include a quantum dot, a quantum rod, or the like. Hereinafter, in one or more embodiments, the description will be given under the condition that the display panel DP is an organic light-emitting display panel.

The display panel DP may output the image IM, and the image IM thus output may be displayed through the display surface IS.

The input-sensing layer ISP may be located on the display panel DP to sense an external input. The input-sensing layer ISP may be directly located on the display panel DP. According to one or more embodiments of the present disclosure, the input-sensing layer ISP may be formed on the display panel DP by a subsequent process. That is, in one or more embodiments, when the input-sensing layer ISP is directly located on the display panel DP, an inner adhesive film is not interposed between the input-sensing layer ISP and the display panel DP. However, the inner adhesive film may be interposed between the input-sensing layer ISP and the display panel DP. In this case, the input-sensing layer ISP is not manufactured together with the display panel DP through the subsequent processes. That is, the input-sensing layer ISP may be manufactured through a process separate from that of the display panel DP and may then be fixed on an upper surface of the display panel DP by the inner adhesive film.

The window WM may be formed of a transparent material capable of outputting the image IM. For example, the window WM may be formed of glass, sapphire, plastic, etc. It is illustrated that the window WM is implemented with a single layer. However, one or more embodiments is not limited thereto. For example, the window WM may include a plurality of layers.

Meanwhile, in one or more embodiments, the non-display area NDA of the electronic device DD described above may correspond to an area that is defined by printing a material including a given color on one area of the window WM. As an example of the present disclosure, the window WM may include a light-blocking pattern for defining the non-display area NDA. The light-blocking pattern that is a colored organic film may be formed, for example, in a coating manner.

The window WM may be coupled to the display module DM through an adhesive film. As an example of the present disclosure, the adhesive film may include an optically clear adhesive (OCA) film. However, the adhesive film is not limited thereto. For example, the adhesive film may include a typical adhesive or sticking agent. For example, the adhesive film may include an optically clear resin (OCR) or a pressure sensitive adhesive (PSA) film.

An anti-reflection layer may be further located between the window WM and the display module DM. The anti-reflection layer decreases the reflectivity of external light incident from above the window WM. The anti-reflection layer according to one or more embodiments of the present disclosure may include a phase retarder and a polarizer.

The display module DM may display the image IM depending on an electrical signal, and may transmit/receive information about an external input. The display module DM may be defined by an active area AA and an inactive area NAA. The active area AA may be defined as an area through which the image IM provided from the display area DA is output. Also, the active area AA may be defined as an area in which the input-sensing layer ISP senses an external input applied from the outside.

The inactive area NAA is adjacent to the active area AA. For example, the inactive area NAA may surround the active area AA. However, this is illustrated by way of example. The inactive area NAA may be defined in various shapes, not limited to one or more embodiments. According to one or more embodiments, the active area AA of the display module DM may correspond to at least part of the display area DA.

The electronic device DD may further include a main circuit board MCB, flexible circuit films D-FCB, driver chips DIC, a driving controller 100, and a voltage generator 300. The main circuit board MCB may be connected to the flexible circuit films D-FCB so as to be electrically connected to the display panel DP. The flexible circuit films D-FCB are connected to the display panel DP so as to electrically connect the display panel DP to the main circuit board MCB. The main circuit board MCB may include a plurality of driving elements. The plurality of driving elements may include a circuit unit for driving the display panel DP. The driver chips DIC may be mounted on the flexible circuit films D-FCB, respectively.

As an example of the present disclosure, the flexible circuit films D-FCB may include a first flexible circuit film D-FCB1, a second flexible circuit film D-FCB2, and a third flexible circuit film D-FCB3. The driver chips DIC may include a first driver chip DIC1, a second driver chip DIC2, and a third driver chip DIC3. The first to third flexible circuit films D-FCB1, D-FCB2, and D-FCB3 may be positioned spaced from one another in the first direction DR1, and may be connected with the display panel DP so as to electrically connect the display panel DP and the main circuit board MCB. The first driver chip DIC1 may be mounted on the first flexible circuit film D-FCB1. The second driver chip DIC2 may be mounted on the second flexible circuit film D-FCB2. The third driver chip DIC3 may be mounted on the third flexible circuit film D-FCB3. However, one or more embodiments of the present disclosure is not limited thereto. For example, the display panel DP may be electrically connected with the main circuit board MCB through one flexible circuit film, and only one driver chip may be mounted on the one flexible circuit film. Also, the display panel DP may be electrically connected with the main circuit board MCB through four or more flexible circuit films, and driver chips may be respectively mounted on the flexible circuit films.

A structure in which the first to third driver chips DIC1, DIC2, and DIC3 are respectively mounted on the first to third flexible circuit films D-FCB1, D-FCB2, and D-FCB3 is illustrated in FIG. 2, but the present disclosure is not limited thereto. For example, the first to third driver chips DIC1, DIC2, and DIC3 may be directly mounted on the display panel DP. In this case, a portion of the display panel DP, on which the first to third driver chips DIC1, DIC2, and DIC3 are mounted, may be bent such that the first to third driver chips DIC1, DIC2, and DIC3 are located on a rear surface of the display module DM. Also, the first to third driver chips DIC1, DIC2, and DIC3 may be directly mounted on the main circuit board MCB.

The input-sensing layer ISP may be electrically connected with the main circuit board MCB through the flexible circuit films D-FCB. However, one or more embodiments of the present disclosure is not limited thereto. That is, the display module DM may additionally include a separate flexible circuit film for electrically connecting the input-sensing layer ISP and the main circuit board MCB.

In one or more embodiments, the driving controller 100 and the voltage generator 300 may be located on the main circuit board MCB. The driving controller 100 and the voltage generator 300 may be electrically connected to the display panel DP through the main circuit board MCB and the flexible circuit films D-FCB.

The electronic device DD further includes an external case EDC for accommodating the display module DM. The outer case EDC may be coupled with the window WM to define the exterior of the electronic device DD. The outer case EDC may absorb external shocks, and may reduce or prevent a foreign material/moisture or the like from infiltrating into the display module DM, such that components accommodated in the outer case EDC are protected. Meanwhile, as an example of the present disclosure, the outer case EDC may be provided in the form of a combination of a plurality of accommodating members.

Figure 3:
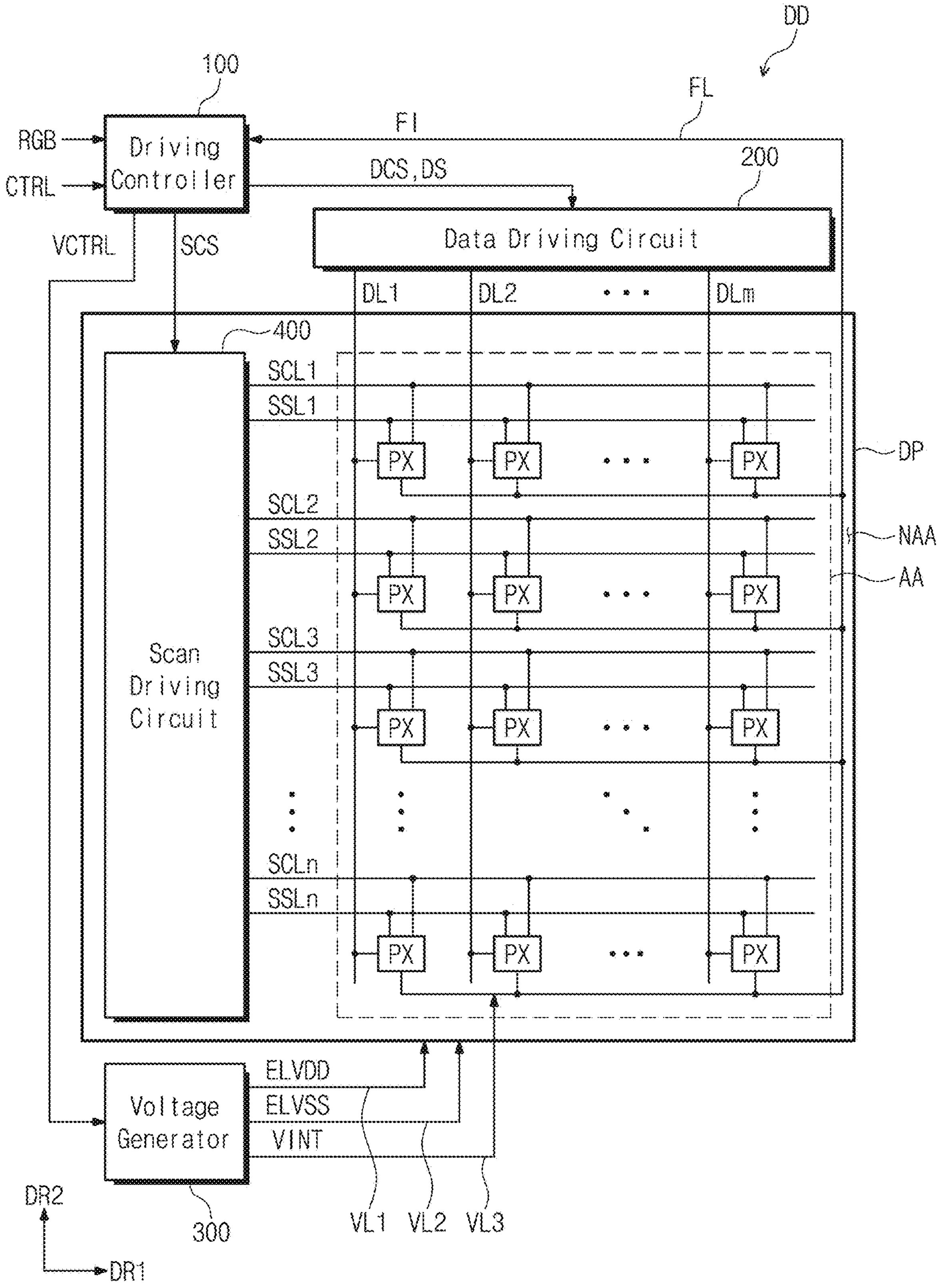
FIG. 3 is a block diagram of an electronic device, according to one or more embodiments of the present disclosure.

FIG. 3 is a block diagram of an electronic device, according to one or more embodiments of the present disclosure.

Referring to FIG. 3, the electronic device DD includes a driving controller 100, a data-driving circuit 200, a voltage generator 300, a scan-driving circuit 400, and a display panel DP. The driving controller 100, the data-driving circuit 200, and the scan-driving circuit 400 may be referred to as a "driving circuit" for providing a data signal to pixels PX of the display panel DP.

The driving controller 100 receives an input image signal RGB and a control signal CTRL. The driving controller 100 converts the input image signal RGB into an image data signal DS, and outputs the image data signal DS. The driving controller 100 outputs a scan control signal SCS and a data control signal DCS. In one or more embodiments, the driving controller 100 may output a voltage control signal VCTRL for controlling the voltage generator 300.

The data-driving circuit 200 receives the data control signal DCS and the image data signal DS from the driving controller 100. The data-driving circuit 200 converts the image data signal DS into data signals and then outputs the data signals to a plurality of data lines DL1 to DLm to be described later. The data signals refer to analog voltages corresponding to grayscale values of the image data signal DS. The data-driving circuit 200 may be located in the driver chips DIC shown in FIG. 2.

The display panel DP includes first scan lines SCL1 to SCLn, second scan lines SSL1 to SSLn, the data lines DL1 to DLm, and pixels PX.

The display panel DP may be divided into the active area AA and the inactive area NAA. The pixels PX may be positioned in the active area AA. The scan-driving circuit 400 may be positioned in the inactive area NAA.

The first scan lines SCL1 to SCLn and the second scan lines SSL1 to SSLn are positioned spaced from each other in the second direction DR2. The data lines DL1 to DLm extend from the data-driving circuit 200 in a direction opposite to the second direction DR2, and are arranged spaced from one another in the first direction DR1.

The plurality of pixels PX are electrically connected to the first scan lines SCL1 to SCLn, the second scan lines SSL1 to SSLn, and the data lines DL1 to DLm. For example, the first row of pixels may be connected to the scan lines SCL1 and SSL1. Moreover, the second row of pixels may be connected to the scan lines SCL2 and SSL2.

Each of the plurality of pixels PX includes a light-emitting element ED (see FIG. 4) and a pixel circuit PXC (see FIG. 4) for controlling the light emission of the light-emitting element ED. The pixel circuit PXC may include a plurality of transistors and a capacitor. The scan-driving circuit 400 may include transistors formed through the same process as the pixel circuit PXC. In one or more embodiments, the light-emitting element ED may be an organic light-emitting diode. However, the present disclosure is not limited thereto.

Each of the plurality of pixels PX receives a first driving voltage ELVDD, a second driving voltage ELVSS, and an initialization voltage VINT.

The scan-driving circuit 400 receives the scan control signal SCS from the driving controller 100. In response to the scan control signal SCS, the scan-driving circuit 400 may output first scan signals to the first scan lines SCL1 to SCLn, and may output second scan signals to the second scan lines SSL1 to SSLn.

In one or more embodiments, the scan-driving circuit 400 may be placed in the inactive area NAA adjacent to the first side of the active area AA. The first scan lines SCL1 to SCLn and the second scan lines SSL1 to SSLn extend in the first direction DR1 from the scan-driving circuit 400.

In one or more embodiments, the scan-driving circuit 400 may be located on each of a first side and a second side of the active area AA. For example, the scan-driving circuit located on the first side of the active area AA may provide the first scan signals to the first scan lines SCL1 to SCLn. The scan-driving circuit located on the second side of the active area AA may provide the second scan signals to the second scan lines SSL1 to SSLn.

The voltage generator 300 generates voltages for operating the display panel DP. In one or more embodiments, the voltage generator 300 generates a first driving voltage ELVDD, a second driving voltage ELVSS, and an initialization voltage VINT, which are suitable for an operation of the display panel DP. The first driving voltage ELVDD, the second driving voltage ELVSS and the initialization voltage VINT may be provided to the display panel DP through a first voltage line VL1, a second voltage line VL2, and a third voltage line VL3.

As well as the first driving voltage ELVDD, the second driving voltage ELVSS, and the initialization voltage VINT, the voltage generator 300 may further generate various voltages suitable for operations of the display panel DP, the driving controller 100, the data-driving circuit 200, and the scan-driving circuit 400.

In one or more embodiments, the driving controller 100 may output the voltage control signal VCTRL for setting a voltage level of a first driving voltage based on the input image signal RGB.

In one or more embodiments, the driving controller 100 may output the voltage control signal VCTRL based on a feedback current signal FI received through a feedback line FL from the display panel DP. The configuration and operation of the driving controller 100 will be described in detail later.

Figure 4:
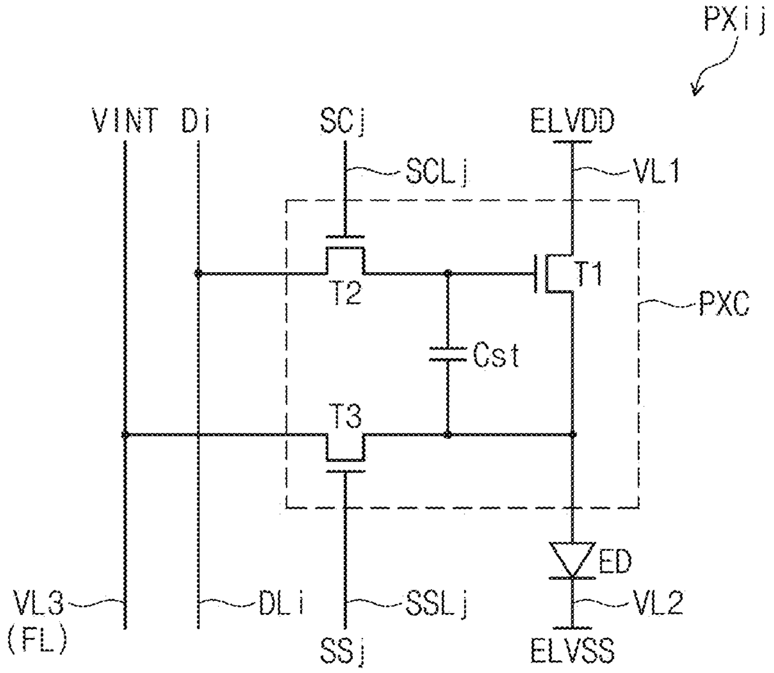
FIG. 4 is an equivalent circuit diagram of a pixel, according to one or more embodiments of the present disclosure.

FIG. 4 is an equivalent circuit diagram of a pixel, according to one or more embodiments of the present disclosure.

FIG. 4 illustrates an equivalent circuit diagram of a pixel PXij connected to an i-th data line DLi among the data lines DL1 to DLm, a j-th first scan line SCLj among the first scan lines SCL1 to SCLn, and a j-th second scan line SSLj among the second scan lines SSL1 to SSLn, which are illustrated in FIG. 3.

Each of the plurality of pixels PX shown in FIG. 3 may have the same circuit configuration as the equivalent circuit diagram of the pixel PXij shown in FIG. 4. In one or more embodiments, the pixel PXij includes the at least one light-emitting element ED and the pixel circuit PXC.

The pixel circuit PXC may include at least one transistor, which is electrically connected to the light-emitting element ED, and which is used to provide a current corresponding to the data signal Di delivered from the data line DLi to the light-emitting element ED. In one or more embodiments, the pixel circuit PXC of the pixel PXij includes a first transistor T1, a second transistor T2, a third transistor T3, and a capacitor Cst. Each of the first to third transistors T1 to T3 may be an N-type transistor by using an oxide semiconductor as a semiconductor layer. However, the present disclosure is not limited thereto. For example, each of the first to third transistors T1 to T3 may be a P-type transistor having a low-temperature polycrystalline silicon (LTPS) semiconductor layer. In one or more embodiments, at least one of the first to third transistors T1 to T3 may be an N-type transistor and the others thereof may be P-type transistors. Moreover, the circuit configuration of a pixel according to one or more embodiments of the present disclosure is not limited to one or more embodiments of FIG. 4. The pixel circuit PXC illustrated in FIG. 3 is only an example. For example, the configuration of the pixel circuit PXC may be modified and implemented.

Referring to FIG. 3, the first scan line SCLj may deliver the first scan signal SCj. The second scan line SSLj may deliver the second scan signal SSj. The data line DLi delivers a data signal Di. The data signal Di may have a voltage level corresponding to the input image signal RGB that is input to the electronic device DD (see FIG. 1).

The first driving voltage ELVDD and the initialization voltage VINT may be delivered to the pixel circuit PXC through the first voltage line VL1 and the third voltage line VL3. The second driving voltage ELVSS may be delivered to a cathode (or a second terminal) of the light-emitting element ED through the second voltage line VL2.

The first transistor T1 includes a first electrode connected to the first voltage line VL1, a second electrode electrically connected to an anode (or a first terminal) of the light-emitting element ED, and a gate electrode connected to one end of the capacitor Cst. The first transistor T1 may supply a driving current to the light-emitting element ED in response to the data signal Di delivered through the data line DLi depending on a switching operation of the second transistor T2.

The second transistor T2 includes a first electrode connected to the data line DLi, a second electrode connected to the gate electrode of the first transistor T1, and a gate electrode connected to the first scan line SCLj. The second transistor T2 may be turned on in response to the first scan signal SCj received through the first scan line SCLj so as to deliver the data signal Di delivered through the data line DLi to the gate electrode of the first transistor T1.

The third transistor T3 includes a first electrode connected to the third voltage line VL3, a second electrode connected to the anode of the light-emitting element ED, and a gate electrode connected to the second scan line SSLj. The third transistor T3 may be turned on in response to the second scan signal SSj received through the second scan line SSLj so as to deliver the initialization voltage VINT to the anode of the light-emitting element ED.

As described above, one end of the capacitor Cst is connected to the gate electrode of the first transistor T1, and the other end of the capacitor Cst is connected to the second electrode of the first transistor T1. The structure of the pixel PXij according to one or more embodiments is not limited to the structure illustrated in FIG. 4. The number of transistors included in the pixel PXij, the number of capacitors, and the connection relationship may be modified in various manners.

The pixel PXij may operate in an emission mode and a current-sensing mode. When the third transistor T3 is turned on in the emission mode, the initialization voltage VINT from the third voltage line VL3 may be delivered to the anode of the light-emitting element ED.

When the third transistor T3 is turned on in the current-sensing mode, the current of the anode of the light-emitting element ED corresponding to the data signal Di may be delivered to the third voltage line VL3. In one or more embodiments, the third voltage line VL3 may be the feedback line FL.

In one or more embodiments, the third voltage line VL3 and the feedback line FL may be different wires from each other.

In one or more embodiments, the feedback line FL may be directly connected to the anode of the light-emitting element ED. In other words, the current of the anode of the light-emitting element ED may be directly delivered to the driving controller 100 (see FIG. 3) through the feedback line FL.

Figure 5:
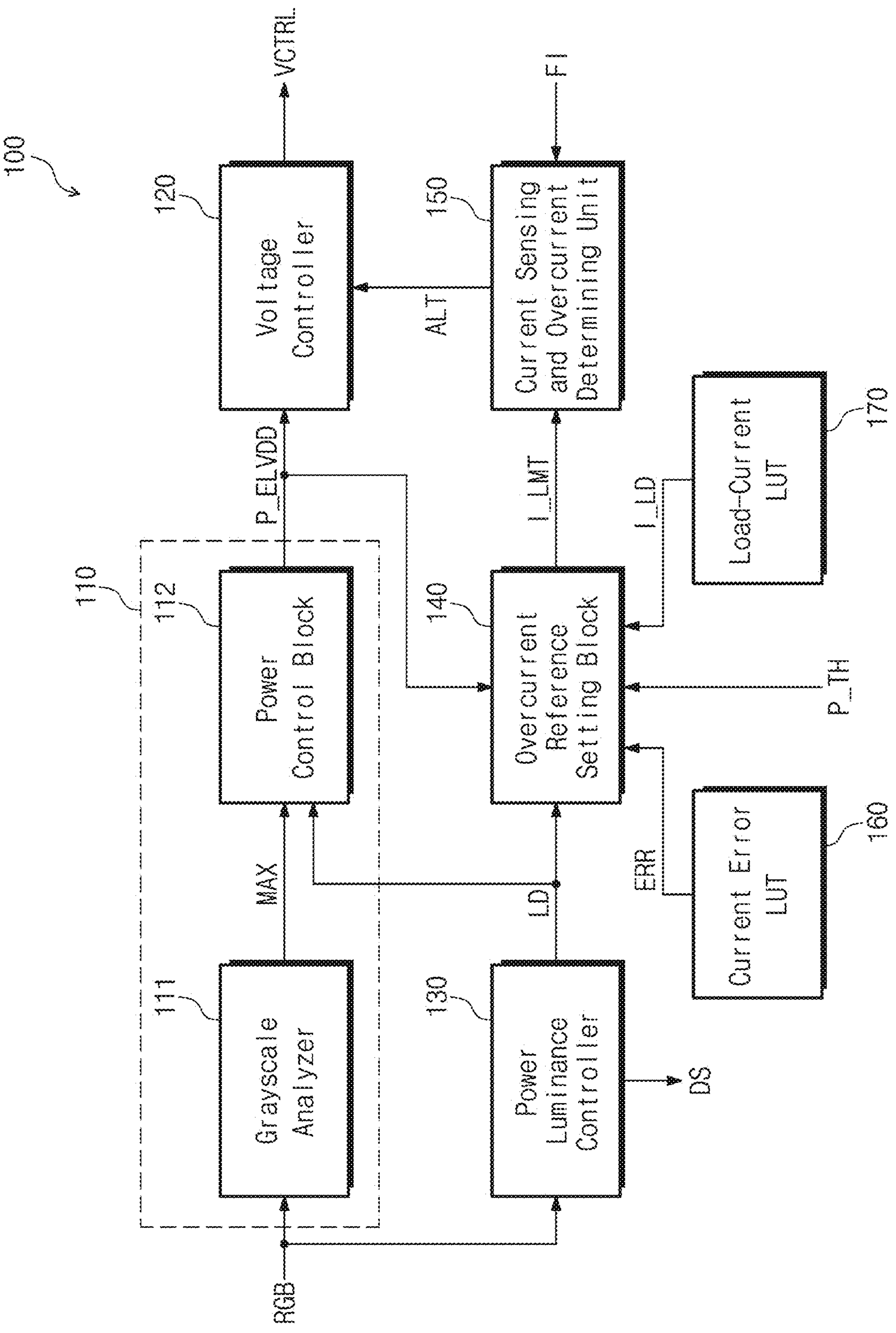
FIG. 5 is a block diagram illustrating a configuration of a driving controller.

FIG. 5 is a block diagram showing a configuration of the driving controller 100.

FIG. 5 shows components related to a voltage control function for controlling power consumption among functions of the driving controller 100. The driving controller 100 may further include configurations (e.g., configurations related to the function of converting the input image signal RGB to the image data signal DS, or configurations related to the function of outputting the scan control signal SCS and the data control signal DCS in response to the control signal CTRL) related to various functions in addition to the configuration shown in FIG. 5.

Referring to FIGS. 3 and 5, the driving controller 100 includes a voltage determination block 110, a voltage controller 120, a power luminance controller 130, an overcurrent-reference-setting block 140, a current-sensing-and-overcurrent-determining unit 150, a current error lookup table 160, and a load-current lookup table 170.

The voltage determination block 110 analyzes the grayscale of the input image signal RGB and outputs a voltage signal P_ELVDD according to the analyzed grayscale. In one or more embodiments, the voltage determination block 110 may determine the voltage level of the first driving voltage ELVDD according to the analyzed grayscale, and may output the voltage signal P_ELVDD based on the determined voltage level of the first driving voltage ELVDD and the load LD.

The voltage determination block 110 includes a grayscale analyzer 111 and a power control block 112.

The grayscale analyzer 111 analyzes the grayscale of the input image signal RGB of one frame. The grayscale analyzer 111 extracts the highest grayscale MAX among the input image signal RGB of one frame.

The power control block 112 determines the voltage level of the first driving voltage ELVDD based on the highest grayscale MAX from the grayscale analyzer 111 and based on the load LD from the power luminance controller 130. The power control block 112 outputs the voltage signal P_ELVDD corresponding to the determined voltage level of the first driving voltage ELVDD.

The power luminance controller 130 calculates the load LD of the input image signal RGB. In one or more embodiments, the power luminance controller 130 may adjust the luminance of the image displayed on the display panel DP (see FIG. 3) depending on the load LD of the input image signal RGB. In other words, the power luminance controller 130 may output the image data signal DS, which is obtained by adjusting the grayscale level of the input image signal RGB, based on the load LD of the input image signal RGB.

The overcurrent-reference-setting block 140 outputs an overcurrent reference value I_LMT based on the load LD from the power luminance controller 130 and based on the voltage signal P_ELVDD from the power control block 112.

In one or more embodiments, the overcurrent-reference-setting block 140 may output the overcurrent reference value I_LMT based on the load LD and the voltage signal P_ELVDD with reference to the current error lookup table 160, with reference to a rush power reference value P_TH, and with reference to the load-current lookup table 170.

The rush power reference value P_TH may be a value determined in the specification of the electronic device DD.

The overcurrent-reference-setting block 140 may output the overcurrent reference value I_LMT. In one or more embodiments, the overcurrent-reference-setting block 140 may reduce the power consumption of the display panel DP depending on the operating environment of the electronic device DD, and may change the overcurrent reference value I_LMT to reduce or prevent damage to the display panel DP due to overcurrent.

In one or more embodiments, the overcurrent-reference-setting block 140 may output the overcurrent reference value I_LMT based on the voltage level of the first driving voltage ELVDD, which is indicated by the voltage signal P_ELVDD, and the load LD.

The current error lookup table 160 stores a current error ERR according to the voltage level of the first driving voltage ELVDD. The current error lookup table 160 may provide the current error ERR with the overcurrent-reference-setting block 140.

The load-current lookup table 170 stores a maximum current I_LD according to the load LD. The load-current lookup table 170 may provide the maximum current I_LD according to the load LD to the overcurrent-reference-setting block 140.

In other words, the overcurrent-reference-setting block 140 may receive the current error ERR, which is received from the current error lookup table 160, and which corresponds to the voltage level of the first driving voltage ELVDD indicated by the voltage signal P_ELVDD, may receive the maximum current I_LD corresponding to the load LD from the load-current lookup table 170, and may output the overcurrent reference value I_LMT.

The current-sensing-and-overcurrent-determining unit 150 receives the feedback current signal FI from the display panel DP, compares a current level of the feedback current signal FI with the overcurrent reference value I_LMT, and outputs a first signal ALT corresponding to the comparison result. For example, when the current level of the feedback current signal FI is lower than the overcurrent reference value I_LMT, the current-sensing-and-overcurrent-determining unit 150 outputs the first signal ALT of a first level (e.g., a low level). When the current level of the feedback current signal FI is higher than or equal to the overcurrent reference value I_LMT, the current-sensing-and-overcurrent-determining unit 150 outputs the first signal ALT of a second level (e.g., a high level).

When the first signal ALT is at the first level (e.g., a low level), the voltage controller 120 outputs the voltage control signal VCTRL corresponding to the voltage signal P_ELVDD. That is, the voltage controller 120 may output the voltage control signal VCTRL in response to the voltage signal P_ELVDD.

The voltage generator 300 may change the voltage level of the first driving voltage ELVDD in response to the voltage control signal VCTRL.

In one or more embodiments, when the first signal ALT is at the second level (e.g., a high level), the voltage controller 120 may output the voltage control signal VCTRL corresponding to a voltage level that is lower than the voltage level of the first driving voltage ELVDD indicated by the voltage signal P_ELVDD.

Figure 6:
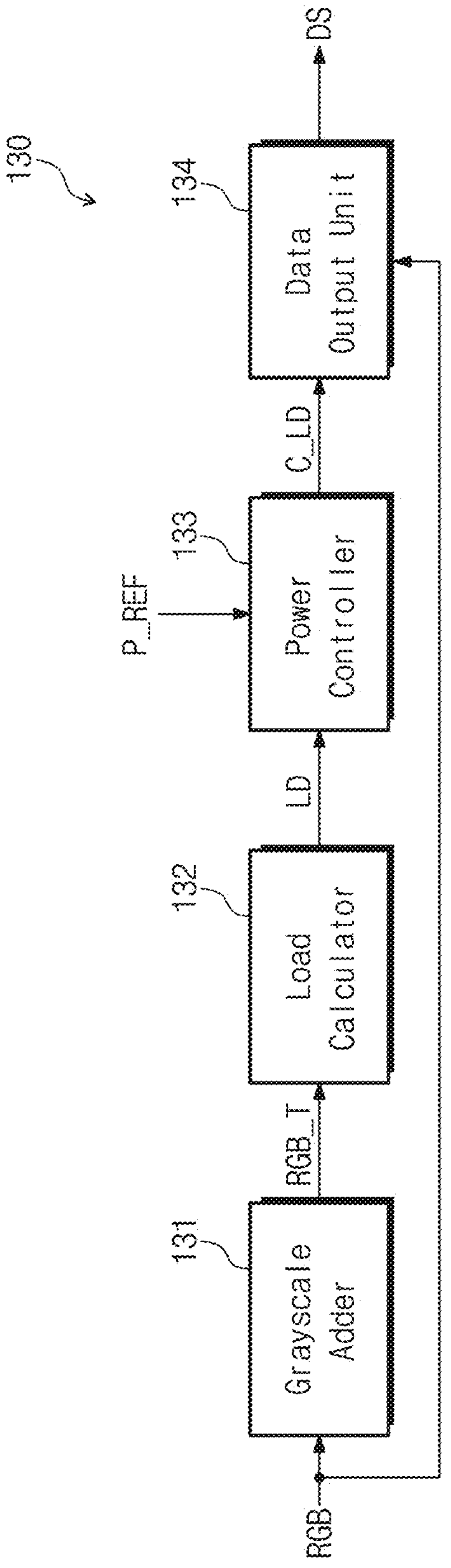
FIG. 6 is a block diagram showing a configuration of the power luminance controller shown in FIG. 5.

FIG. 6 is a block diagram showing a configuration of the power luminance controller 130 shown in FIG. 5.

Referring to FIG. 6, the power luminance controller 130 includes a grayscale adder 131, a load calculator 132, a power controller 133, and a data output unit 134.

The grayscale adder 131 sums the input image signal RGB of one frame, and then outputs a sum signal RGB_T.

For example, the display panel DP may be divided into a plurality of blocks. The grayscale adder 131 may output the sum of grayscales of the blocks as the sum signal RGB_T.

The load calculator 132 may calculate the load LD of one frame based on the sum signal RGB_T.

The load LD may have values between 0% and 100%. For example, when the input image signal RGB corresponds to a full black image (e.g., 0 grayscale), the load LD may be about 0%. Furthermore, when the input image signal RGB corresponds to a full white image (e.g., 255 grayscale), the load LD may be about 100%.

In one or more embodiments, the load LD output from the load calculator 132 may be provided to the overcurrent-reference-setting block 140 shown in FIG. 5.

The power controller 133 adjusts the load level of the load signal LD depending on a power consumption reference value P_REF, and outputs an adjusted load signal C_LD.

The data output unit 134 may output the image data signal DS, which is obtained by adjusting the grayscale level of the input image signal RGB, based on the load signal C_LD thus adjusted.

Figure 7:
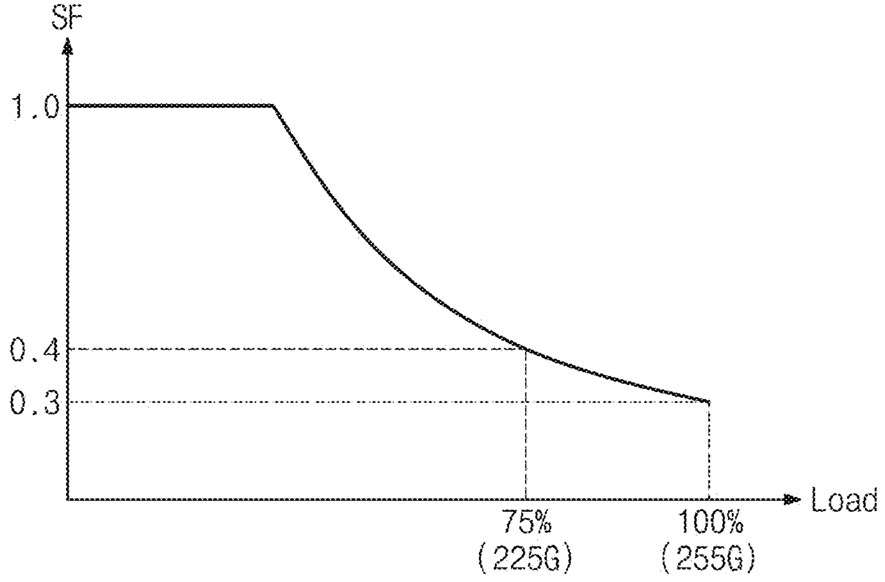
FIG. 7 is a diagram showing a scale factor of the data output unit shown in FIG. 5.

FIG. 7 is a diagram showing a scale factor of the data output unit 134 shown in FIG. 5.

Referring to FIGS. 6 and 7, to maintain or reduce a grayscale level of the input image signal RGB, the data output unit 134 may calculate a scale factor SF according to the adjusted load signal C_LD. The scale factor SF may have a value less than or equal to 1. For example, when the scale factor SF is 1, the grayscale of the image data signal DS may be the same as the input image signal RGB. For another example, when the scale factor SF is 0.5, the grayscale of the image data signal DS may be reduced to half the grayscale of the input image signal RGB.

In one or more embodiments, the scale factor SF may be a different value depending on the load signal C_LD. For example, as the load signal C_LD is great (e.g., close to 100%), the scale factor SF may be small. When the load signal C_LD is small (e.g., 0%), the scale factor SF may be 1.

Hereinafter, for convenience of description, it is assumed that the load signal C_LD is the same as the load LD.

For example, when the sum signal RGB_T for the input image signal RGB corresponds to a full white image (255 grayscale), the scale factor SF may be about 0.3. When the sum signal RGB_T corresponds to 225 grayscale, the scale factor SF may be about 0.4. When the sum signal RGB_T corresponds to a full black image (0 grayscale), the scale factor SF may be 1.

When the sum signal RGB_T for the input image signal RGB indicates a high grayscale (e.g., when the power consumption of the display panel DP is expected to increase), the power luminance controller 130 lowers the grayscale of the image data signal DS according to the scale factor SF so as to be lower than the grayscale of the input image signal RGB. As a result, damage to the display panel DP (see FIG. 3) due to overcurrent may be reduced or prevented.

Returning to FIG. 5, when the load LD output from the power luminance controller 130 is higher than a reference load, the grayscale of the image data signal DS may be adjusted by the power luminance controller 130, thereby reducing the current consumption of the display panel DP (see FIG. 3).

Figure 8A:
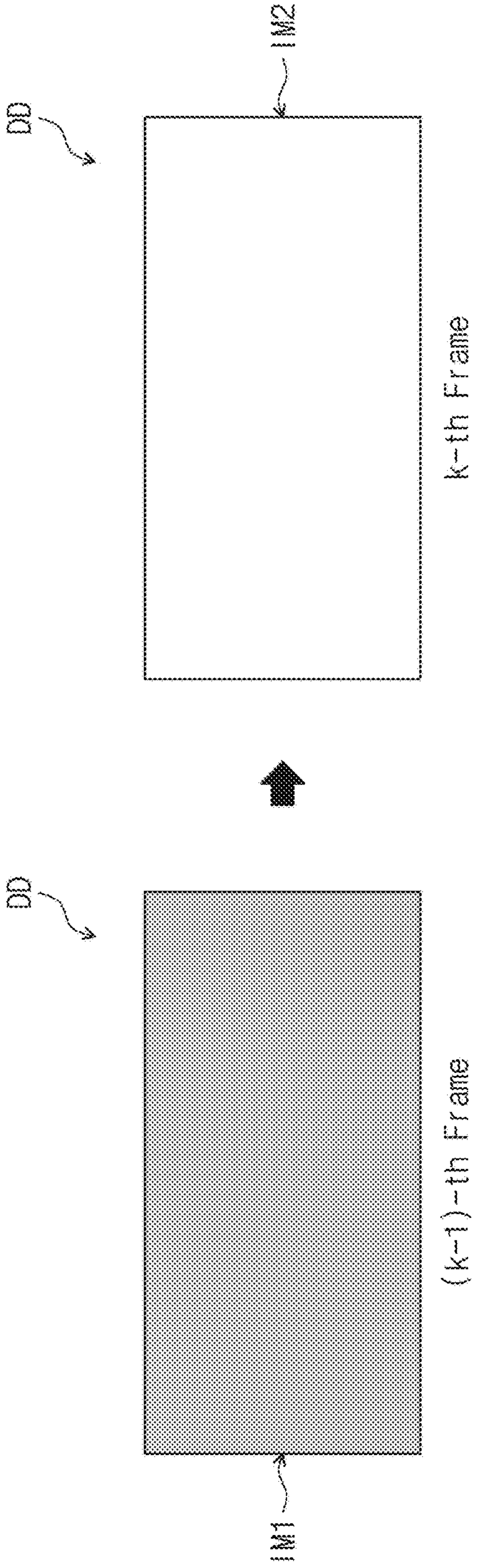
FIG. 8A is a diagram showing a first image and a second image, which are displayed on an electronic device.
Figure 8B:
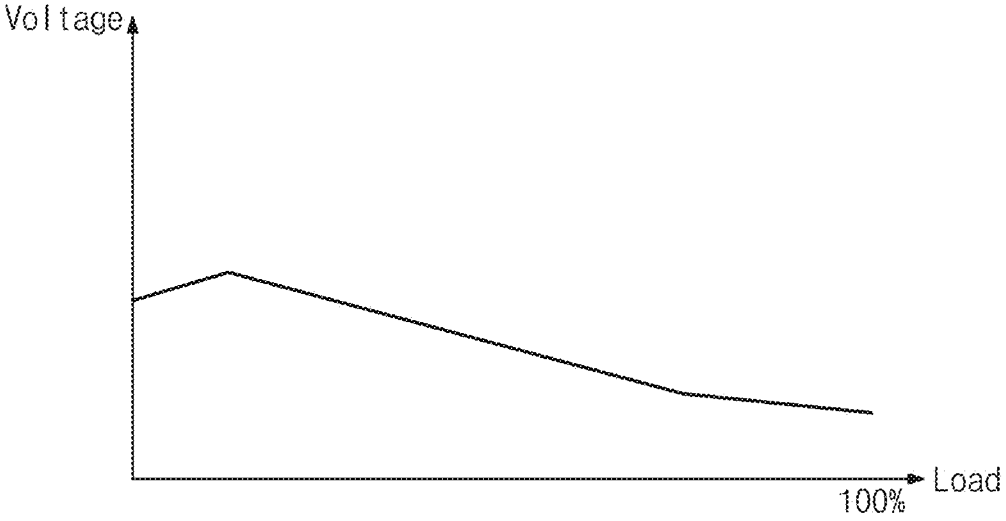
FIG. 8B is a diagram showing an EL voltage according to a load in a present frame after a first image is displayed in a previous frame shown in FIG. 8A.
Figure 8C:
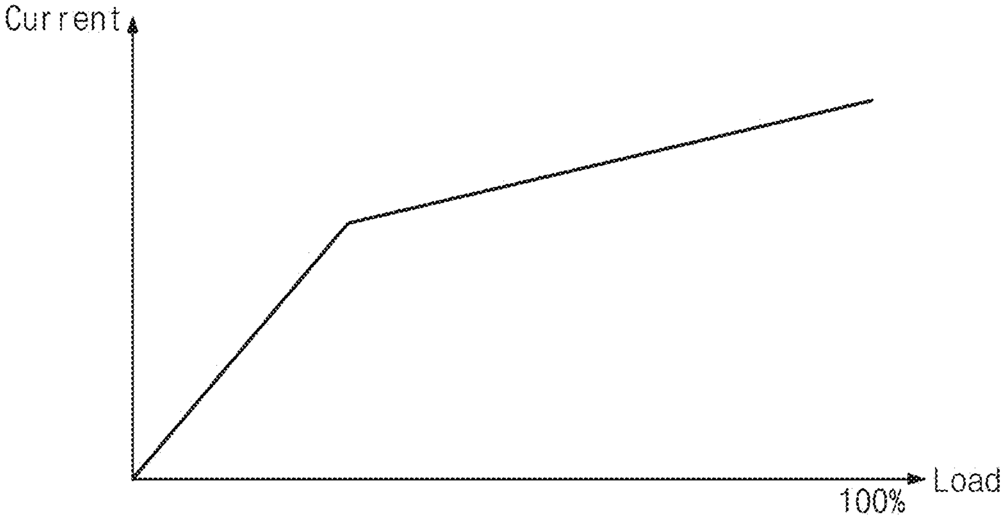
FIG. 8C is a diagram showing an EL current according to a load in a present frame after a first image is displayed in a previous frame shown in FIG. 8A.
Figure 8D:
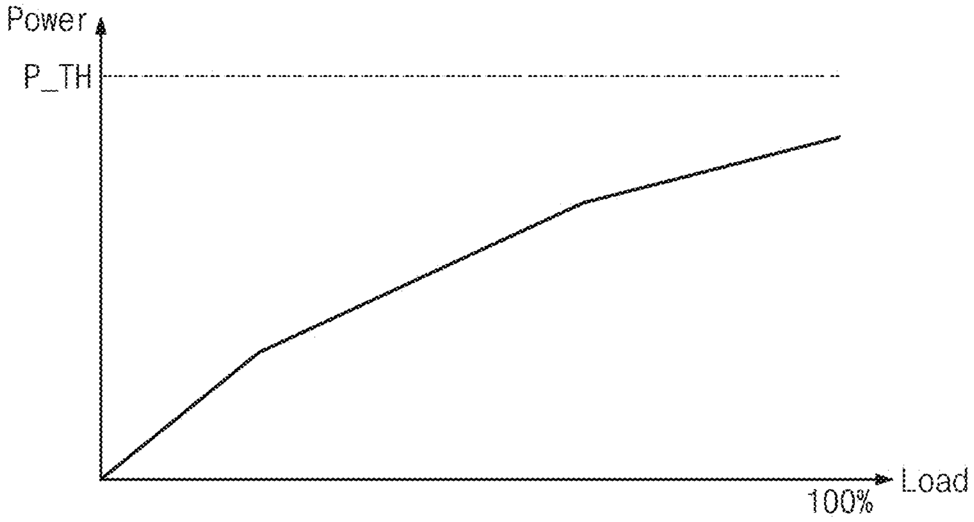
FIG. 8D is a diagram showing EL power consumption according to a load in a present frame after a first image is displayed in a previous frame shown in FIG. 8A.

FIG. 8A is a diagram showing a first image IM1 and a second image IM2, which are displayed on the electronic device DD. FIG. 8B is a diagram showing an EL voltage according to the load LD in a present frame after the first image IM1 is displayed in a previous frame shown in FIG. 8A. FIG. 8C is a diagram showing an EL current according to the load LD in a present frame after the first image IM1 is displayed in a previous frame shown in FIG. 8A. FIG. 8D is a diagram showing EL power consumption according to the load LD in a present frame after the first image IM1 is displayed in a previous frame shown in FIG. 8A.

Referring to FIGS. 5 and 8A, it is shown that the first image IM1 is displayed in a previous frame (e.g., a (k−1)-th frame) on the electronic device DD, and the second image IM2 is displayed in a present frame (e.g., a k-th frame).

In one or more embodiments, the first image IM1 is an image corresponding to a gray grayscale (e.g., 32 grayscale). The first image IM1 may be displayed at the same grayscale throughout the electronic device DD. When the first image IM1 is displayed on the electronic device DD, the load LD may be 1%. When the highest grayscale MAX of the input image signal RGB is 32 grayscale, and the load LD is 1%, the voltage determination block 110 may set a voltage level of the first driving voltage ELVDD to a first voltage level (e.g., about 22 V).

In one or more embodiments, the second image IM2 is an image corresponding to a white grayscale (e.g., 255 grayscale). The second image IM2 may be displayed at the same grayscale throughout the electronic device DD. When the second image IM2 is displayed on the electronic device DD, the load LD may be 100%. When the highest grayscale MAX of the input image signal RGB is 255 grayscale, and the load LD is 100%, the voltage determination block 110 may set the voltage level of the first driving voltage ELVDD to a second voltage level (e.g., about 27 V) that is higher than the first voltage level. The voltage determination block 110 sets the voltage level of the first driving voltage ELVDD to be higher as the highest grayscale MAX of the input image signal RGB is higher.

Figure 9A:
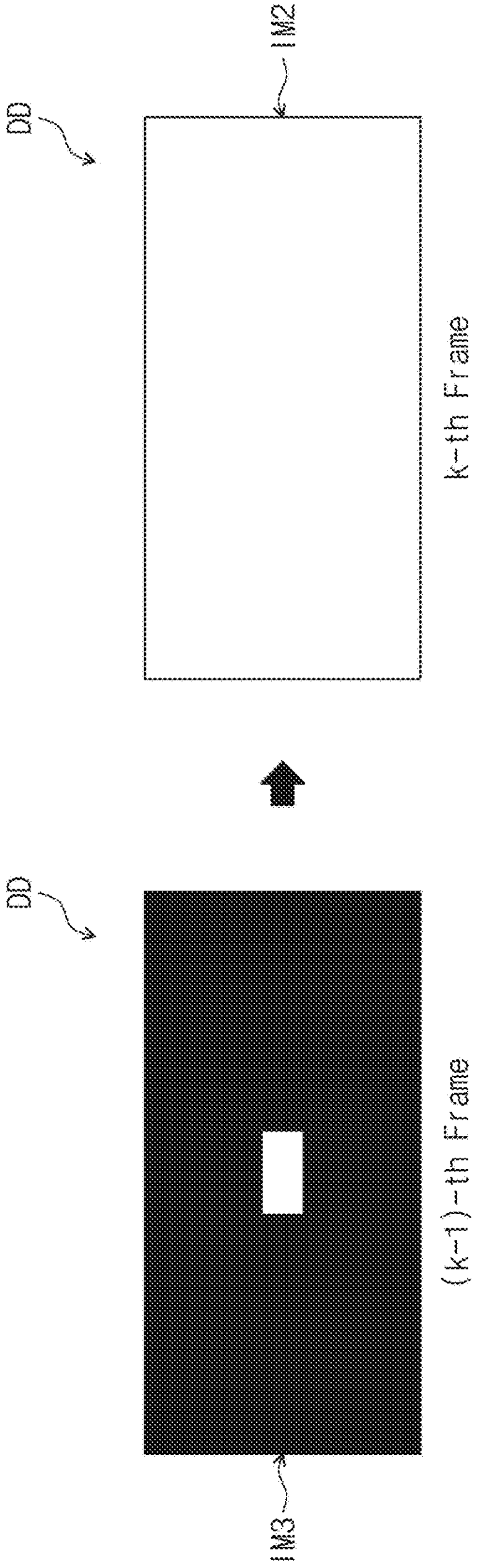
FIG. 9A is a diagram showing a third image and a second image, which are displayed on an electronic device.
Figure 9B:
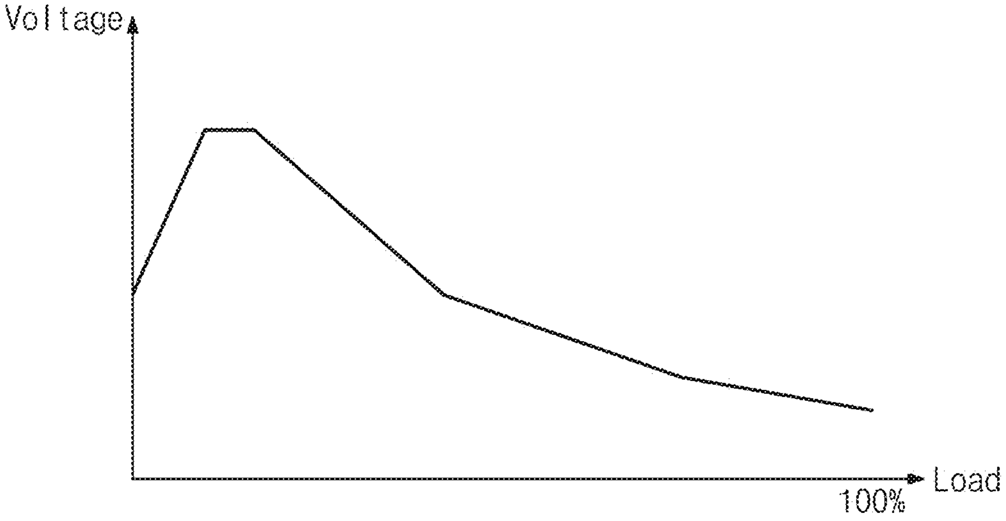
FIG. 9B is a diagram showing an EL voltage according to a load in a present frame after a third image is displayed in a previous frame shown in FIG. 9A.
Figure 9C:
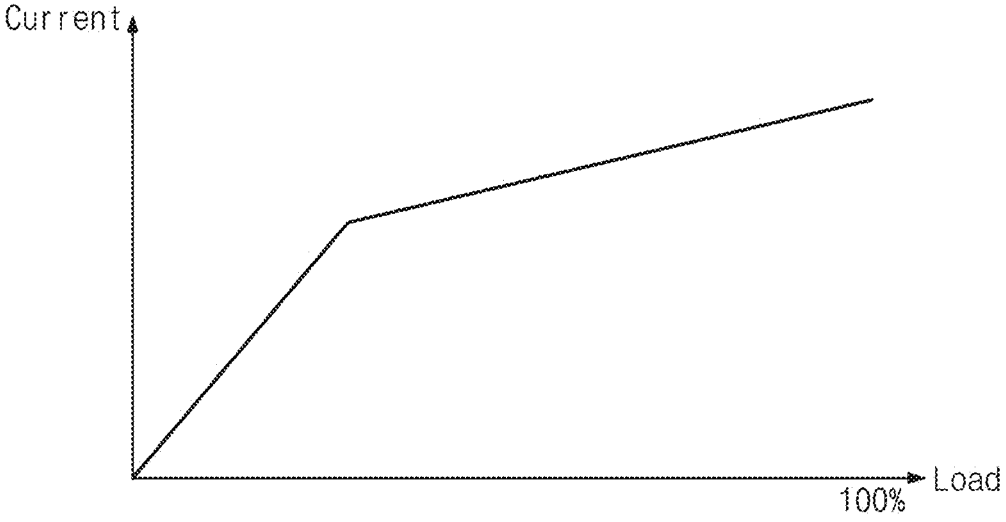
FIG. 9C is a diagram showing an EL current according to a load LD in a present frame after a third image is displayed in a previous frame shown in FIG. 9A.
Figure 9D:
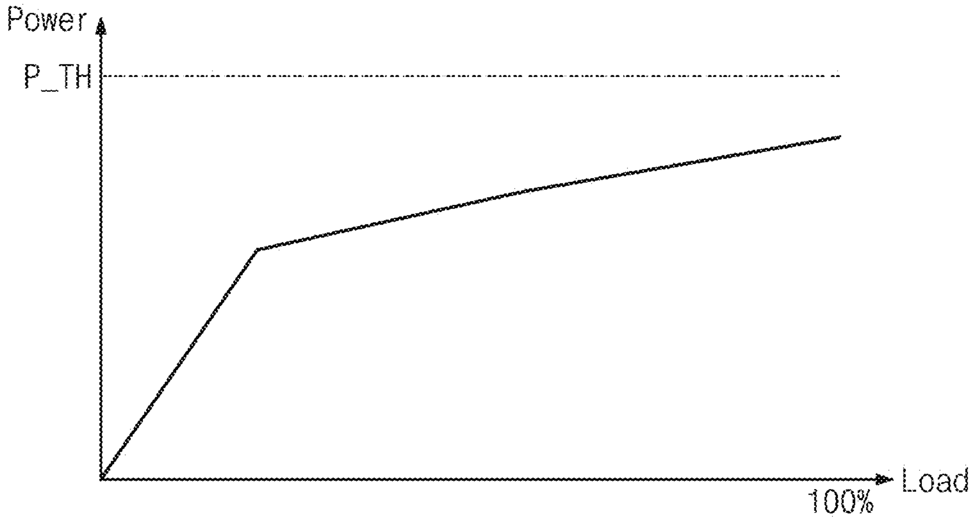
FIG. 9D is a diagram showing EL power consumption according to a load in a present frame after a third image is displayed in a previous frame shown in FIG. 9A.

FIG. 9A is a diagram showing a third image IM3 and a second image IM2, which are displayed on the electronic device DD. FIG. 9B is a diagram showing an EL voltage according to the load LD in a present frame after the third image IM3 is displayed in a previous frame shown in FIG. 9A. FIG. 9C is a diagram showing an EL current according to the load LD in a present frame after the third image IM3 is displayed in a previous frame shown in FIG. 9A. FIG. 9D is a diagram showing EL power consumption according to the load LD in a present frame after the third image IM3 is displayed in a previous frame shown in FIG. 9A.

Referring to FIGS. 5 and 9A, it is shown that the third image IM3 is displayed in a previous frame (e.g., a (k−1)-th frame) on the electronic device DD, and the second image IM2 is displayed in a present frame (e.g., a k-th frame).

In one or more embodiments, the third image IM3 includes an image corresponding to a black grayscale (e.g., 0 grayscale) and an image corresponding to a white grayscale (e.g., 255 grayscale). In other words, the image corresponding to the white grayscale has a square shape, and the image corresponding to the black grayscale has a shape surrounding the white grayscale having a square shape. When the third image IM3 is displayed on the electronic device DD, the load LD may be 1%. When the highest grayscale MAX of the input image signal RGB is 255 grayscale, and the load LD is 1%, the voltage determination block 110 may set a voltage level of the first driving voltage ELVDD to a second voltage level that is higher than a first voltage level.

In one or more embodiments, the second image IM2 is an image corresponding to a white grayscale (e.g., 255 grayscale). The second image IM2 may be displayed at the same grayscale throughout the electronic device DD. When the second image IM2 is displayed on the electronic device DD, the load LD may be 100%. When the highest grayscale MAX of the input image signal RGB is 255 grayscale, and the load LD is 100%, the voltage determination block 110 may set the voltage level of the first driving voltage ELVDD to the second voltage level.

The power luminance controller 130 shown in FIG. 6 requires the time of 1 frame to calculate the load LD for the input image signal RGB. The reason is that the load LD of one frame even is calculated when the grayscale adder 131 outputs the sum signal RGB_T, which is obtained by summing the input image signal RGB of one frame.

Accordingly, the voltage level of the first driving voltage ELVDD in the present frame (e.g., the k-th frame) may be set as the voltage level of the first driving voltage ELVDD in the previous frame (e.g., the (k−1)-th frame).

Referring to FIG. 8B, the voltage of the anode of the light-emitting element ED (see FIG. 4) (e.g., the EL voltage) may vary depending on the load LD. When the second image IM2 is displayed in the present frame while the first driving voltage ELVDD is at the first voltage level that is relatively low, the voltage level of the EL voltage according to the load LD does not change significantly.

As shown in FIG. 9B, when the second image IM2 is displayed in the present frame while the first driving voltage ELVDD is at a second level that is higher than the first voltage level, the voltage level of the EL voltage is high when the load LD is low.

Referring to FIGS. 8C and 9C, the current (e.g., EL current) of the anode of the light-emitting element ED (see FIG. 4) according to the load LD when the first driving voltage ELVDD is at the first voltage level is substantially the same, then the current of the anode of the light-emitting element ED when the first driving voltage ELVDD is at the second voltage level. In one or more embodiments, the EL current may be the feedback current signal FI (see FIG. 5).

Referring to FIG. 8D, as the load LD increases when the voltage level of the first driving voltage ELVDD is the first voltage level, the power consumption of the pixel PXij (see FIG. 4) gradually increases.

Referring to FIG. 9D, it may be seen that when the voltage level of the first driving voltage ELVDD is the second voltage level, the power consumption of the pixel PXij (see FIG. 4) is high even at the low load LD. That is, even when the power consumption of the pixel PXij (see FIG. 4) is lower than the rush power reference value P_TH, the upward slope of the power consumption according to the load LD is great.

Figure 10:
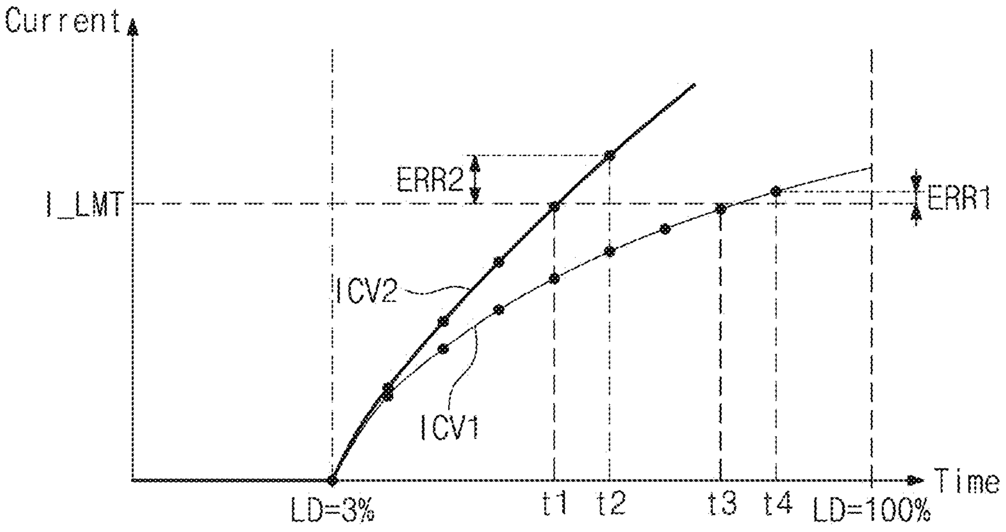
FIG. 10 is a diagram showing a change in EL current according to a voltage level of a first driving voltage.

FIG. 10 is a diagram showing a change in EL current according to a voltage level of the first driving voltage ELVDD.

Referring to FIG. 10, when the load LD changes from 3% to 100% over time, the amount of change in EL current may vary depending on the voltage level of the first driving voltage ELVDD.

When the voltage level of the first driving voltage ELVDD is the first voltage level, the EL current changes along a first curve ICV1. When the voltage level of the first driving voltage ELVDD is the second voltage level, the EL current changes along a second curve ICV2. In other words, the change amount of EL current when the first driving voltage ELVDD is at the second voltage level is greater than that when the first driving voltage ELVDD is at the first voltage level. In the example shown in FIG. 10, the second voltage level of the first driving voltage ELVDD is higher than the first voltage level.

As the voltage level of the first driving voltage ELVDD is high, the saturation operation area of the first transistor T1 increases, and the drain-source voltage increases. Accordingly, a change amount of EL current increases.

When the voltage level of the first driving voltage ELVDD is the first voltage level and the second voltage level, the EL current at a first time point t1 is less than the overcurrent reference value I_LMT.

When the voltage level of the first driving voltage ELVDD is the second voltage level, the EL current at a second time point t2 is greater than the overcurrent reference value I_LMT.

In other words, at the first time point t1, the EL current is less than the overcurrent reference value I_LMT. At the second time point t2, the EL current is greater than the overcurrent reference value I_LMT.

When the voltage level of the first driving voltage ELVDD is the first voltage level, the EL current at the third time point t3 is less than the overcurrent reference value I_LMT.

When the voltage level of the first driving voltage ELVDD is the first voltage level, the EL current at a fourth time point t4 is greater than the overcurrent reference value I_LMT.

In other words, at the third time point t3, the EL current is less than the overcurrent reference value I_LMT. At the fourth time point t4, the EL current is greater than the overcurrent reference value I_LMT.

In one or more embodiments, the first to fourth time points t1, t2, t3, and t4 may correspond to first to fourth frames, respectively.

In other words, an error ERR2 between the overcurrent reference value I_LMT and the EL current in the second frame is greater than an error ERR1 between the overcurrent reference value I_LMT and the EL current in the fourth frame. When the error ERR2 between the overcurrent reference value I_LMT and the EL current is great in the second frame, power consumption increases. Excessive increase in power consumption may cause malfunction or damage to the electronic device DD.

Figure 11:
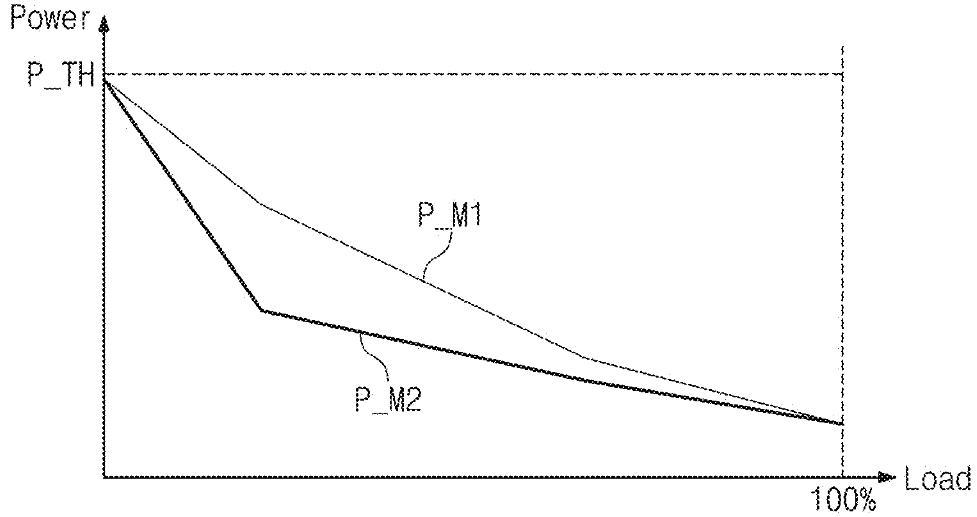
FIG. 11 is a diagram showing a margin of power consumption according to a voltage level of a first driving voltage.

FIG. 11 is a diagram showing the margin of power consumption according to a voltage level of the first driving voltage ELVDD.

Referring to FIG. 11, a power consumption margin may be a difference value between the rush power reference value P_TH and the actual power consumption that is determined in the specifications of the electronic device DD. For example, when the load LD is 1%, the power consumption margin may be equal to the rush power reference value P_TH. In other words, when the load LD is 1%, the voltage level of the first driving voltage ELVDD is maximized, and thus power consumption may be relatively great.

As a result, a power consumption margin P_M2, which is when the voltage level of the first driving voltage ELVDD is a second voltage level, is less than a power consumption margin P_M1, which is when the voltage level of the first driving voltage ELVDD is a first voltage level.

When the highest grayscale MAX of the input image signal RGB (see FIG. 5) changes to the maximum value (e.g., 255) while the power consumption margin is relatively small, power consumption may rise rapidly due to momentary overcurrent.

Figure 12:
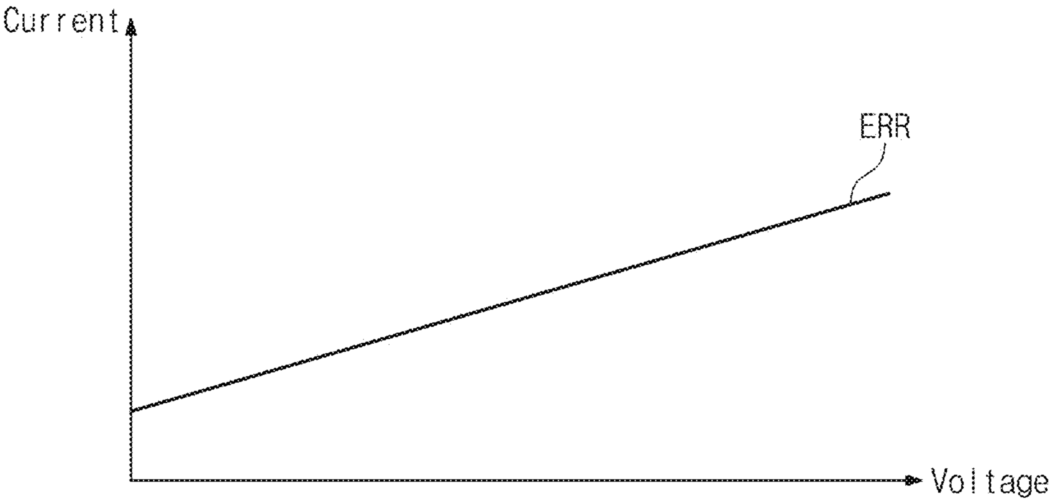
FIG. 12 shows a current error according to a voltage level of a first driving voltage of the current error lookup table shown in FIG. 5.

FIG. 12 shows the current error ERR according to a voltage level of the first driving voltage ELVDD of the current error lookup table 160 shown in FIG. 5.

Referring to FIGS. 5 and 12, as a voltage level of the first driving voltage ELVDD increases, the current error ERR increases. The current error ERR means an error between the overcurrent reference value I_LMT and the EL current shown in FIG. 10. For example, the current error ERR2, which is when the voltage level of the first driving voltage ELVDD is a second voltage level, is greater than the current error ERR1, which is when the voltage level of the first driving voltage ELVDD is a first voltage level. In other words, as the voltage level of the first driving voltage ELVDD is relatively high, the value of the current error ERR has a relatively great value.

The overcurrent-reference-setting block 140 may calculate the overcurrent reference value I_LMT based on Equation 1.

$$\text{I\_LMT} = (\text{P\_TH} - ELVDD \times (\text{I\_LD} + ERR))/ELVDD + \text{I\_LD} \quad \text{Equation 1}$$

In Equation 1, P_TH denotes a rush power reference value; I_LD denotes a maximum current according to the load LD, ELVDD denotes a first driving voltage, and ERR denotes a current error corresponding to the voltage level of the first driving voltage ELVDD.

The overcurrent-reference-setting block 140 may output the overcurrent reference value I_LMT based on the voltage level of the first driving voltage ELVDD indicated by the voltage signal P_ELVDD, and the load LD. In addition, the overcurrent-reference-setting block 140 may output the overcurrent reference value I_LMT with reference to the maximum current I_LD according to the load LD of the load-current lookup table 170, and with reference to the current error ERR according to the voltage level of the first driving voltage ELVDD of the current error lookup table 160.

In one or more embodiments, as the current error ERR is relatively great, the overcurrent reference value I_LMT is relatively small.

Figure 13:
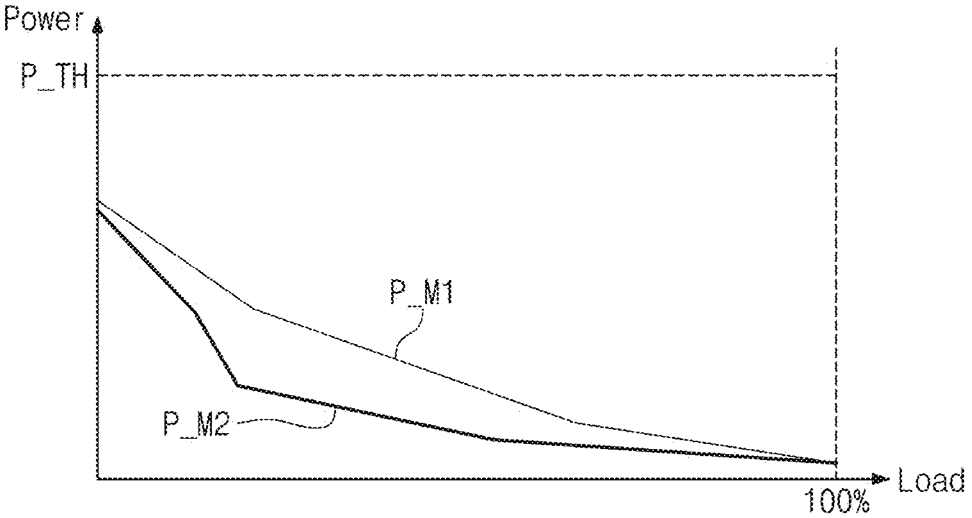
FIG. 13 is a diagram showing a margin of power consumption according to a voltage level of a first driving voltage.

FIG. 13 is a diagram showing the margin of power consumption according to a voltage level of the first driving voltage ELVDD.

Referring to FIG. 13, the overcurrent-reference-setting block 140 may change the overcurrent reference value I_LMT by reflecting the current error ERR according to the voltage level of the first driving voltage ELVDD.

The rush power may be calculated based on Equation 2 below.

$$\text{Rush power} = EL \text{ voltage} \times (\text{overcurrent reference value} + \text{current error}) \quad \text{Equation 2}$$

In other words, as the rush power increases by the current error ERR, the power consumption margins P_M1 and P_M2 may be reduced to be lower than the power consumption margins P_M1 and P_M2 shown in FIG. 11.

Figure 14:
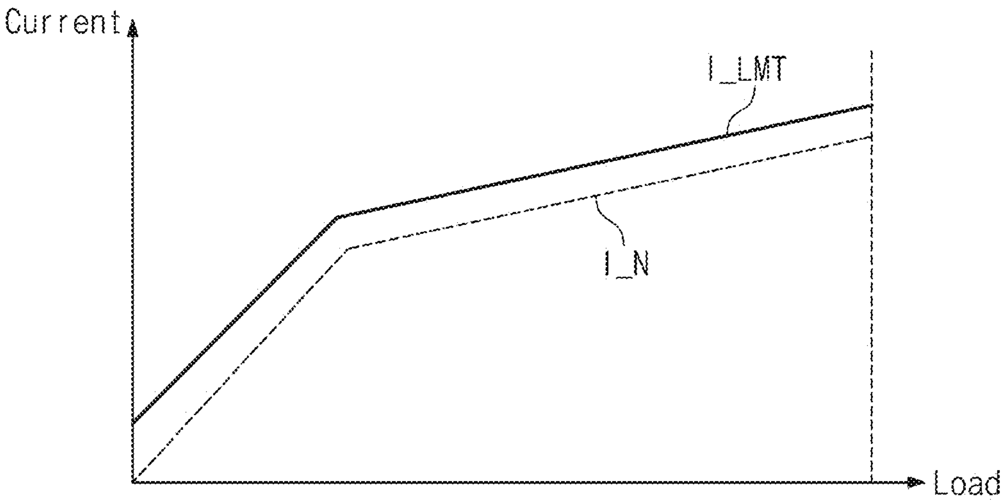
FIG. 14 is a diagram showing an overcurrent reference value.

FIG. 14 is a diagram showing the overcurrent reference value I_LMT.

Referring to FIGS. 5 and 14, in a normal state, an EL current I_N, which is according to the load LD, increases as the load LD increases. The overcurrent-reference-setting block 140 may set the overcurrent reference value I_LMT by adding a margin (e.g., predetermined margin) to the EL current I_N according to the load LD. In this case, as shown in FIG. 10, when the voltage level of the first driving voltage ELVDD is high, overcurrent may flow.

Figure 15:
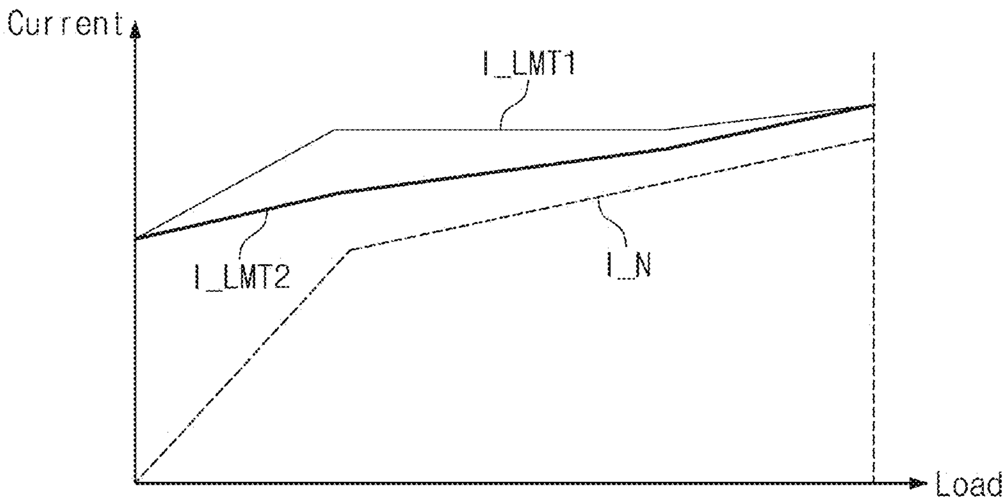
FIG. 15 is a diagram showing an overcurrent reference value according to a voltage level of a first driving voltage.

FIG. 15 is a diagram showing the overcurrent reference value I_LMT according to the voltage level of the first driving voltage ELVDD.

Referring to FIGS. 5 and 15, when a voltage level of the first driving voltage ELVDD is a first voltage level, the overcurrent reference value I_LMT has a first overcurrent reference value I_LMT1 depending on the load LD.

When the voltage level of the first driving voltage ELVDD is a second voltage level that is higher than the first voltage level, the overcurrent reference value I_LMT has a second overcurrent reference value I_LMT2 depending on the load LD.

The second overcurrent reference value I_LMT2 is lower than the first overcurrent reference value I_LMT1. For example, when the load LD is relatively low, the second overcurrent reference value I_LMT2 has a lower value than the first overcurrent reference value I_LMT1.

As described in FIG. 10, even though the EL current at the first time point t1 is lower than the overcurrent reference value I_LMT, which is when the voltage level of the first driving voltage ELVDD is the second voltage level, the EL current at the second time point t2 is relatively greater than the overcurrent reference value I_LMT. At this time, because the error ERR2 between the overcurrent reference value I_LMT and the EL current is relatively great, overcurrent may flow to the pixel PXij (see FIG. 4). In other words, the overcurrent may be suitably detected before the EL current of the pixel PXij rises to be greater than the overcurrent reference value I_LMT.

As shown in FIG. 15, when the voltage level of the first driving voltage ELVDD is a second voltage level that is higher than the first voltage level, the overcurrent-reference-setting block 140 may lower the overcurrent reference value I_LMT to the second overcurrent reference value I_LMT2.

As a result, before the EL current of the pixel PXij rises to be greater than the overcurrent reference value I_LMT (e.g., the first time point t1 in FIG. 10) when the voltage level of the first driving voltage ELVDD is relatively high, the current-sensing-and-overcurrent-determining unit 150 may determine the overcurrent of the feedback current signal FI.

Besides, the occurrence frequency of rush power may be reduced by differently setting a margin current between the EL current I_N according to the load LD and the first overcurrent reference value I_LMT1, and varying the margin current between the EL current I_N according to the load LD and the second overcurrent reference value I_LMT2.

Although one or more embodiments of the present disclosure has been described for illustrative purposes, those skilled in the art will appreciate that various modifications, and substitutions are possible, without departing from the scope and spirit of the present disclosure as disclosed in the accompanying claims. Accordingly, the technical scope of the present disclosure is not limited to the detailed description of this specification, but should be defined by the claims.

An electronic device having such the configuration may set a voltage level of a first driving voltage in consideration of a pattern of an input image signal. Accordingly, power consumption in the electronic device may be optimized. Moreover, an electronic device of the present disclosure may reduce or minimize power consumption by changing an overcurrent reference value, which is an overcurrent determination criterion, depending on the voltage level of the first driving voltage.

While the present disclosure has been described with reference to embodiments thereof, it will be apparent to those of ordinary skill in the art that various changes and modifications may be made thereto without departing from the spirit and scope of the present disclosure as set forth in the following claims, with functional equivalents thereof to be included therein.

What is claimed is:

1. A driving controller comprising:

a voltage determination block configured to analyze a grayscale of an input image signal, and to output a voltage signal according to the analyzed grayscale;

a power luminance controller configured to calculate a load of the input image signal;

an overcurrent-reference-setting block configured to output an overcurrent reference value based on the voltage signal and based on the load;

a current-sensing-and-overcurrent-determining unit configured to receive a feedback current signal, to compare a current level of the feedback current signal with the overcurrent reference value, and to output a first signal corresponding to a comparison result; and a voltage controller configured to output a voltage control signal for setting a voltage level of a first driving voltage based on the voltage signal and based on the first signal, wherein the overcurrent-reference-setting block is further configured to output the overcurrent reference value based on a current error corresponding to the voltage level of the first driving voltage, which is indicated by the voltage signal, and a maximum current corresponding to the load, wherein the overcurrent reference value has a first overcurrent reference value when the first driving voltage is a first voltage level, the first overcurrent reference value being set based on the first voltage level, wherein the overcurrent reference value has a second overcurrent reference value lower than the first overcurrent reference value when the first driving voltage is a second voltage level higher than the first voltage level, the second overcurrent reference value being set based on the second voltage level, and wherein the first signal indicates an overcurrent when the current level of the feedback current signal is greater than or equal to the overcurrent reference value.

2. The driving controller of claim 1, wherein the current error has a value that is greater as the voltage level of the first driving voltage indicated by the voltage signal is higher.

3. The driving controller of claim 2, wherein the overcurrent reference value decreases as a value of the current error increases.

4. The driving controller of claim 1, further comprising:

a current error lookup table configured to store the current error corresponding to the voltage level of the first driving voltage indicated by the voltage signal; and a load-current lookup table configured to store the maximum current corresponding to the load.

5. The driving controller of claim 4, wherein the overcurrent-reference-setting block is configured to output the overcurrent reference value based on the current error and the maximum current.

6. The driving controller of claim 1, wherein the overcurrent-reference-setting block is configured to output the overcurrent reference value equal to P_TH−ELVDD×(I_LD+ERR))/ELVDD+I_LD, P_TH denoting a rush power reference value, I_LD denoting the maximum current, ELVDD denoting the voltage level of the first driving voltage, and ERR denoting the current error.

7. The driving controller of claim 1, wherein the current-sensing-and-overcurrent-determining unit is configured to:

output the first signal of a first level when the current level of the feedback current signal is less than the overcurrent reference value; and output the first signal of a second level when the current level of the feedback current signal is greater than or equal to the overcurrent reference value.

8. The driving controller of claim 7, wherein the voltage controller is configured to:

output the voltage control signal corresponding to the voltage level of the first driving voltage when the first signal is at the first level; and output the voltage control signal corresponding to a voltage level that is lower than the voltage level of the first driving voltage when the first signal is at the second level.

9. The driving controller of claim 1, wherein the voltage determination block comprises:

a grayscale analyzer configured to extract a highest grayscale of the input image signal of one frame; and a power control block configured to determine the voltage level of the first driving voltage based on the highest grayscale and the load.

10. The driving controller of claim 9, wherein the voltage level of the first driving voltage increases as the highest grayscale increases.

11. An electronic device comprising:

a display panel;

a driving controller configured to receive an input image signal, and to output an image data signal;

a data-driving circuit configured to provide the display panel with a data signal corresponding to the image data signal; and a voltage generator configured to provide a first driving voltage to the display panel in response to a voltage control signal, wherein the driving controller comprises:

a voltage determination block configured to analyze a grayscale of the input image signal and to output a voltage signal according to the analyzed grayscale;

a power luminance controller configured to calculate a load of the input image signal;

an overcurrent-reference-setting block configured to output an overcurrent reference value based on the voltage signal and the load;

a current-sensing-and-overcurrent-determining unit configured to receive a feedback current signal from the display panel, to compare a current level of the feedback current signal with the overcurrent reference value, and to output a first signal corresponding to a comparison result; and a voltage controller configured to output the voltage control signal for setting a voltage level of the first driving voltage based on the voltage signal and the first signal, wherein the overcurrent-reference-setting block is further configured to output the overcurrent reference value based on a current error corresponding to the voltage level of the first driving voltage, which is indicated by the voltage signal, and a maximum current corresponding to the load, wherein the overcurrent reference value has a first overcurrent reference value when the first driving voltage is a first voltage level, the first overcurrent reference value being set based on the first voltage level, wherein the overcurrent reference value has a second overcurrent reference value lower than the first overcurrent reference value when the first driving voltage is a second voltage level higher than the first voltage level, the second overcurrent reference value being set based on the second voltage level, and wherein the first signal indicates an overcurrent when the current level of the feedback current signal is greater than or equal to the overcurrent reference value.

12. The electronic device of claim 11, wherein a value of the current error increases as the voltage level of the first driving voltage indicated by the voltage signal increases.

13. The electronic device of claim 12, wherein the overcurrent reference value decreases as the value of the current error increases.

14. The electronic device of claim 11, wherein the driving controller further comprises:

a current error lookup table configured to store the current error corresponding to the voltage level of the first driving voltage; and a load-current lookup table configured to store the maximum current.

15. The electronic device of claim 14, wherein the overcurrent-reference-setting block is configured to output the overcurrent reference value based on the current error and the maximum current.

16. The electronic device of claim 11, wherein the overcurrent-reference-setting block is configured to output the overcurrent reference value equal to P_TH−ELVDD×(I_LD+ERR))/ELVDD+I_LD, P_TH denoting a rush power reference value, I_LD denoting the maximum current, ELVDD denoting the voltage level of the first driving voltage, and ERR denoting the current error corresponding to the voltage level of the first driving voltage.

17. The electronic device of claim 11, wherein the current-sensing-and-overcurrent-determining unit is further configured to:

output the first signal of a first level when the current level of the feedback current signal is less than the overcurrent reference value, and output the first signal of a second level when the current level of the feedback current signal is greater than or equal to the overcurrent reference value.

18. The electronic device of claim 17, wherein the voltage controller is configured to:

output the voltage control signal corresponding to the voltage level of the first driving voltage when the first signal is at the first level; and output the voltage control signal corresponding to a voltage level that is lower than the voltage level of the first driving voltage when the first signal is at the second level.

19. The electronic device of claim 11, wherein the voltage determination block comprises:

a grayscale analyzer configured to extract a highest grayscale of the input image signal of one frame; and a power control block configured to determine the voltage level of the first driving voltage based on the highest grayscale and the load.

20. The electronic device of claim 19, wherein the voltage level of the first driving voltage increases as the highest grayscale increases.

* * * * *